US011711786B2

(12) United States Patent
Hu et al.

(10) Patent No.: US 11,711,786 B2
(45) Date of Patent: Jul. 25, 2023

(54) OPTIMIZATION OF RESOURCE UNIT AND SEGMENT PARSER DESIGN FOR AGGREGATED AND MULTI-RESOURCE UNIT OPERATIONS IN EXTREME HIGH-THROUGHPUT SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 151 days.

(21) Appl. No.: 17/151,621

(22) Filed: Jan. 18, 2021

(65) Prior Publication Data

US 2021/0227510 A1    Jul. 22, 2021

Related U.S. Application Data

(60) Provisional application No. 62/976,385, filed on Feb. 14, 2020, provisional application No. 62/970,778, (Continued)

(51) Int. Cl.
*H04W 72/04* (2023.01)
(52) U.S. Cl.
CPC ................... *H04W 72/04* (2013.01)

(58) Field of Classification Search
CPC ... H04W 72/085; H04W 84/12; H04W 74/04; H04W 72/04; H04L 5/0094;
(Continued)

(56) References Cited

U.S. PATENT DOCUMENTS 11,464,011 B1 * 10/2022 Chu ................. H04W 72/0453
2006/0002486 A1    1/2006 Van Nee
(Continued)

FOREIGN PATENT DOCUMENTS

| CN | 108206727 A | 6/2018 |
|---|---|---|
| CN | 110690939 A | 1/2020 |

(Continued)

OTHER PUBLICATIONS

WO 2020/007271 A1 (Year: 2019).*
(Continued)

*Primary Examiner* — Rushil Parimal Sampat
(74) *Attorney, Agent, or Firm* — Han IP PLLC; Andy M. Han

(57) ABSTRACT

A method pertaining to optimization of resource unit (RU) and segment parser design for aggregated and multi-RU operations in extreme high-throughput (EHT) systems involves coding data for a station (STA) to provide a stream of coded bits. The method also involves processing the stream of coded bits to provide processed bits, including parsing the stream of coded bits to a combination of multiple RUs assigned to the STA in a proportional round-robin fashion. The method further involves transmitting the processed bits to the STA over the combination of multiple RUs.

19 Claims, 28 Drawing Sheets

Related U.S. Application Data filed on Feb. 6, 2020, provisional application No. 62/963,592, filed on Jan. 21, 2020.

(58) Field of Classification Search
CPC . H04L 1/0071; H04L 27/2602; H04L 27/261; H04L 5/0007; H04L 5/001; H04L 5/0039; H04L 5/0044; H04L 5/0048; H04L 27/2603; H04L 5/0026; H04L 5/0042
See application file for complete search history.

(56) References Cited

U.S. PATENT DOCUMENTS

| | | | |
|---|---|---|---|
| 2012/0076219 | A1 | 3/2012 | Srinivasa et al. |
| 2015/0349995 | A1 | 12/2015 | Zhang et al. |
| 2017/0317868 | A1 | 11/2017 | Lin et al. |
| 2019/0238195 | A1 | 8/2019 | Liu et al. |
| 2020/0007265 | A1 | 1/2020 | Min et al. |
| 2021/0126735 | A1* | 4/2021 | Gan ............... H04L 1/0041 |
| 2021/0160889 | A1* | 5/2021 | Yang ............. H04W 72/085 |
| 2021/0160959 | A1* | 5/2021 | Cao ................. H04L 5/001 |

FOREIGN PATENT DOCUMENTS

| | | |
|---|---|---|
| EP | 2144470 A1 | 1/2010 |
| EP | 3806360 A1 | 4/2021 |
| WO | WO 2017044591 A1 | 3/2017 |
| WO | WO 2019173240 A1 | 9/2019 |
| WO | WO 2020007271 A1 | 1/2020 |

OTHER PUBLICATIONS

U.S. Appl. No. 62/941,625 (Year: 2019).*
U.S. Appl. No. 62/940,758 (Year: 2019).*
European Patent Office, European Search Report for European Patent Application No. 21152463.2, dated Jun. 24, 2021.
Taiwan Intellectual Property Office, Office Action for Taiwan Patent Application No. 110102248, dated Mar. 10, 2022.
China National Intellectual Property Administration, First Office Action in China Patent Application No. 202110079630.2, dated May 6, 2023.
Zhao, Ling et al: "Design of a Partially Parallel Encoding Structure for Quasi-Cyclic Low Density Check Code", Aviation School, Jan. 15, 2019.

* cited by examiner

BANDWIDTH 240/160 + 80 MHz
- $N_{SEG} = 3$ (EACH SEGMENT WITH 80 MHz)

BANDWIDTH 320/160 + 160 MHz
- $N_{SEG} = 4$ (EACH SEGMENT WITH 80 MHz)

FIG. 8

| RU COMBINATION | $vN_{sd}$ | ACROSS-80MHz RATIO | RATIO | APPROXIMATE RATIO $(m_0:m_1:m_2:m_3)$ | $N_{sec}$ | REMAINING BITS (PER SYMBOL) |
|---|---|---|---|---|---|---|
| 484 + 996 | 1448 | 468/980 | 0.477551 | 1:2 | 468 | 44 * $N_{bpscs}$ on RU996 |
| (242+484) + 996 | 1682 | 702/980 | 0.716326 | 3:4 | 234 | 44 * $N_{bpscs}$ on RU996 |
| 242 + 996 | 1214 | 234/980 | 0.238775 | 1:4 | 234 | 44 * $N_{bpscs}$ on RU996 |
| (242+484) + (242+484) | 1404 | 702/702 | 1 | 1:1 | 702 | 0 |
| 242 + (484+242) | 936 | 234/702 | 0.333333 | 1:3 | 234 | 0 |
| 484 + 2 * 996 | 2428 | 468/980 | 0.477551 | 1:2:2 | 468 | 44 * $N_{bpscs}$ on RU996 |
| 484 + 3 * 996 | 3408 | 468/980 | 0.477551 | 1:2:2:2 | 468 | 44 * $N_{bpscs}$ on RU996 |
| 242 + 484 | 702 | 234/468 | 0.5 | 1:2 | 234 | 0 |

FIG. 13

| RU COMBINATION | $vN_{sd}$ | $D_{TM}$ | $N_{drop}$ |
|---|---|---|---|
| 484 + 996 | 1448 | 38 | 4 |
| (242+484) + 996 | 1682 | 40 | 2 |
| 242 + 996 | 1214 | 31 | 5 |
| (242+484) + (242+484) | 1404 | 36 | 0 |
| 242 + (484+242) | 936 | 18 (OR 24 OR ELSE) | 0 |
| 484 + 2 * 996 | 2428 | 55 | 8 |
| 484 + 3 * 996 | 3408 | 71 | 0 |
| 242 + 484 | 702 | 18 | 0 |

| RU Combination | vN_sd | Across-80MHz Ratio | Round Robin Ratio ($m_0:m_1:m_2:m_3$) | Remaining Bits (per symbol) |
|---|---|---|---|---|
| 484 + 996 | 1448 | 468/980 | 1:2 | 44 * $N_{bpscs}$ on RU996 |
| (242+484) + 996 | 1682 | 702/980 | 3:4 | 44 * $N_{bpscs}$ on RU996 |
| 242 + 996 | 1214 | 234/980 | 1:4 | 44 * $N_{bpscs}$ on RU996 |
| (242+484) + (242+484) | 1404 | 702/702 | 1:1 | 0 |
| 242 + (484+242) | 936 | 234/702 | 1:3 | 0 |
| 484 + 2 * 996 | 2428 | 468/980 | 1:2:2 | 44 * $N_{bpscs}$ on RU996 |
| 484 + 3 * 996 | 3408 | 468/980 | 1:2:2:2 | 44 * $N_{bpscs}$ on RU996 |
| 242 + 484 | 702 | 234/468 | 1:2 | 0 |
| 484 + (242+484) | 1170 | 468/703 | 2:3 | 0 |
| 2 * 996 | 1960 | 980/980 | 1:1 | 0 |
| 3 * 996 | 2940 | 980/980/980 | 1:1:1 | 0 |
| 4 * 996 | 3920 | 980/980/980/980 | 1:1:1:1 | 0 |

(B)

| RU Combination | vN_sd | Across-80MHz Ratio | Round Robin Ratio ($m_0:m_1:m_2:m_3$) | Remaining Bits (per symbol) |
|---|---|---|---|---|
| 484 + 996 | 1448 | 468/980 | 117:245 | 0 |
| (242+484) + 996 | 1682 | 702/980 | 351:490 | 0 |
| 242 + 996 | 1214 | 234/980 | 117:490 | 0 |
| 484 + 2 * 996 | 2428 | 468/980 | 117:245:245 | 0 |
| 484 + 3 * 996 | 3408 | 468/980 | 117:245:245:245 | 0 |

FIG. 23

| RU COMBINATION | vN_sd | D_TM | N_DROP |
|---|---|---|---|
| 484 + 996 | 1448 | 38 or (32) or (36) | 4 or (8) or (8) |
| (242+484) + 996 | 1682 | 40 or (41) | 1 or (2) |
| 242 + 996 | 1214 | 31 or (28) | 5 or (10) |
| (242+484) + (242+484) | 1404 | 39 or (36) or (41) | 0 or (0) or (10) |
| 242 + (484+242) | 936 | (30 or 31) or (18 or 24) | (6) or (0) |
| 484 + 2 * 996 | 2428 | 55 | 8 |
| 484 + 3 * 996 | 3408 | 71 | 0 |
| 242 + 484 | 702 | 18 or (20) | 0 or (2) |
| 484 + (242+484) | 1170 | 30 or 39 | 0 |
| 2 * 996 | 1960 | 40 | 0 |
| 3 * 996 | 2940 | 60 | 0 |
| 4 * 996 | 3920 | 80 | 0 |

FIG. 24

| RU COMBINATION | RU ORDER (LOW TO HIGH FREQUENCY) | $N_{sd\_total}$ | PROPORTIONAL RATIO (m0:m1:m2:m3) | LEFTOVER BITS (ON RU996) |
|---|---|---|---|---|
| 484 + 996 | 484 + 996 | 1448 | 1s:2s | $N_{lft} * N_{bpscs}$ |
|  | 996 + 484 | 1448 | 2s:1s | $N_{lft} * N_{bpscs}$ |
| (242+484) + 996 | (242 + 484) + 996 | 1682 | 3s:4s | $N_{lft} * N_{bpscs}$ |
|  | 996 + (242 + 484) | 1682 | 4s:3s | $N_{lft} * N_{bpscs}$ |
| 484 + 2 * 996 | 484 + 996 + 996 | 2428 | 1s:2s:2s | $N_{lft} * N_{bpscs}$ |
|  | 996 + 484 + 996 | 2428 | 2s:1s:2s | $N_{lft} * N_{bpscs}$ |
|  | 996 + 996 + 484 | 2428 | 2s:2s:1s | $N_{lft} * N_{bpscs}$ |
| 484 + 3 * 996 | 484 + 996 + 996 + 996 | 3408 | 1s:2s:2s:2s | $N_{lft} * N_{bpscs}$ |
|  | 996 + 484 + 996 + 996 | 3408 | 2s:1s:2s:2s | $N_{lft} * N_{bpscs}$ |
|  | 996 + 996 + 996 + 484 | 3408 | 2s:2s:2s:1s | $N_{lft} * N_{bpscs}$ |
| 2 * 996 | 996 + 996 | 1960 | 1s:1s | 0 |
| 3 * 996 | 996 + 996 + 996 | 2940 | 1s:1s:1s | 0 |
| 4 * 996 | 996 + 996 + 996 + 996 | 3920 | 1s:1s:1s:1s | 0 |

(A)

(B)

OPTIMIZATION OF RESOURCE UNIT AND SEGMENT PARSER DESIGN FOR AGGREGATED AND MULTI-RESOURCE UNIT OPERATIONS IN EXTREME HIGH-THROUGHPUT SYSTEMS

CROSS REFERENCE TO RELATED PATENT APPLICATION

The present disclosure is part of a non-provisional patent application claiming the priority benefit of U.S. Provisional Patent Application Nos. 62/963,592, 62/970,778 and 62/976,385, filed 21 Jan. 2020, 6 Feb. 2020 and 14 Feb. 2020, respectively, the contents of which being incorporated by reference in their entirety.

TECHNICAL FIELD

The present disclosure is generally related to wireless communications and, more particularly, to optimization of resource unit (RU) and segment parser design for aggregated and multi-RU operations in extreme high-throughput (EHT) systems.

BACKGROUND

Unless otherwise indicated herein, approaches described in this section are not prior art to the claims listed below and are not admitted as prior art by inclusion in this section.

In next-generation EHT systems such as wireless local area network (WLAN) systems in accordance with the upcoming Institute of Electrical and Electronics Engineers (IEEE) 802.11be standard, multiple RUs (multi-RU) can be assigned to a single station (STA) to improve spectral efficiency. Moreover, wider bandwidths (e.g., 240 MHz and 320 MHz) as well as aggregated RU are accepted to improve system performance. There is, therefore, a need for a RU and segment parser design for optimized aggregated and multi-RU operations in next-generation EHT systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to optimization of RU and segment parser design for aggregated and multi-RU operations in EHT systems.

In one aspect, a method pertaining to optimization of RU and segment parser design for aggregated and multi-RU operations in EHT systems may involve coding data for a STA to provide a stream of coded bits. The method may also involve processing the stream of coded bits to provide processed bits, including parsing the stream of coded bits to a combination of multiple RUs assigned to the STA in a proportional round-robin fashion. The method may further involve transmitting the processed bits to the STA over the combination of multiple RUs.

In another aspect, a method pertaining to optimization of RU and segment parser design for aggregated and multi-RU operations in EHT systems may involve approximating a proportional ratio of a plurality of integers with each of the integers representative of a respective size of a corresponding RU of a combination of multiple RUs. The method may also involve alternatively allocating a respective number of coded bits of a stream of coded bits to each RU of the combination of large multiple RUs in a round-robin fashion, with the respective number being proportional to the respective size of the corresponding RU in the proportional ratio to provide processed bits. The method may further involve transmitting the processed bits over the combination of multiple RUs to a STA.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 8 is a diagram of an example scenario in accordance with the present disclosure.

FIG. 13 is a diagram of an example scenario in accordance with the present disclosure.

FIG. 14 is a diagram of an example scenario in accordance with the present disclosure.

FIG. 23 is a diagram of an example scenario in accordance with the present disclosure.

FIG. 24 is a diagram of an example scenario in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of RU and segment parser design for aggregated and multi-RU operations in EHT systems. According to the present disclosure, a number of possible solutions may be implemented separately or jointly. That is, although these possible solutions may be described below separately, two or more of these possible solutions may be implemented in one combination or another.

Figure 1:
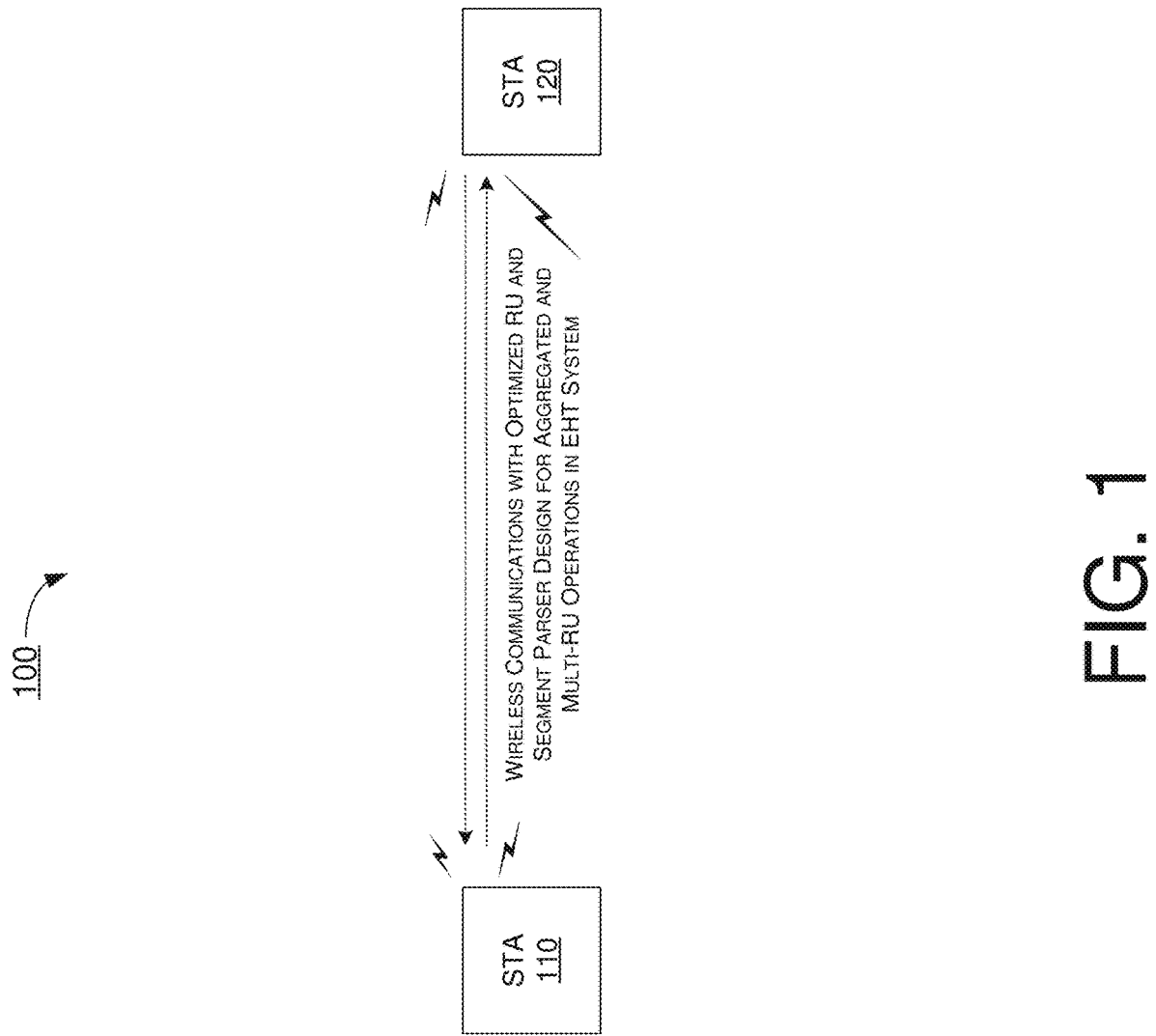
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 25 illustrate examples of implementation of various proposed schemes in network environment 100 in accordance with the present disclosure. The following description of various proposed schemes is provided with reference to FIG. 1~FIG. 25.

Referring to FIG. 1, network environment 100 may involve at least a STA 110 communicating wirelessly with a STA 120. Each of STA 110 and STA 120 may be a non-access point (non-AP) STA or, alternatively, either of STA 110 and STA 120 may function as an AP. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other with optimized RU and segment parser design for aggregated and multi-RU operations in EHT systems in accordance with various proposed schemes described below.

Figure 2:
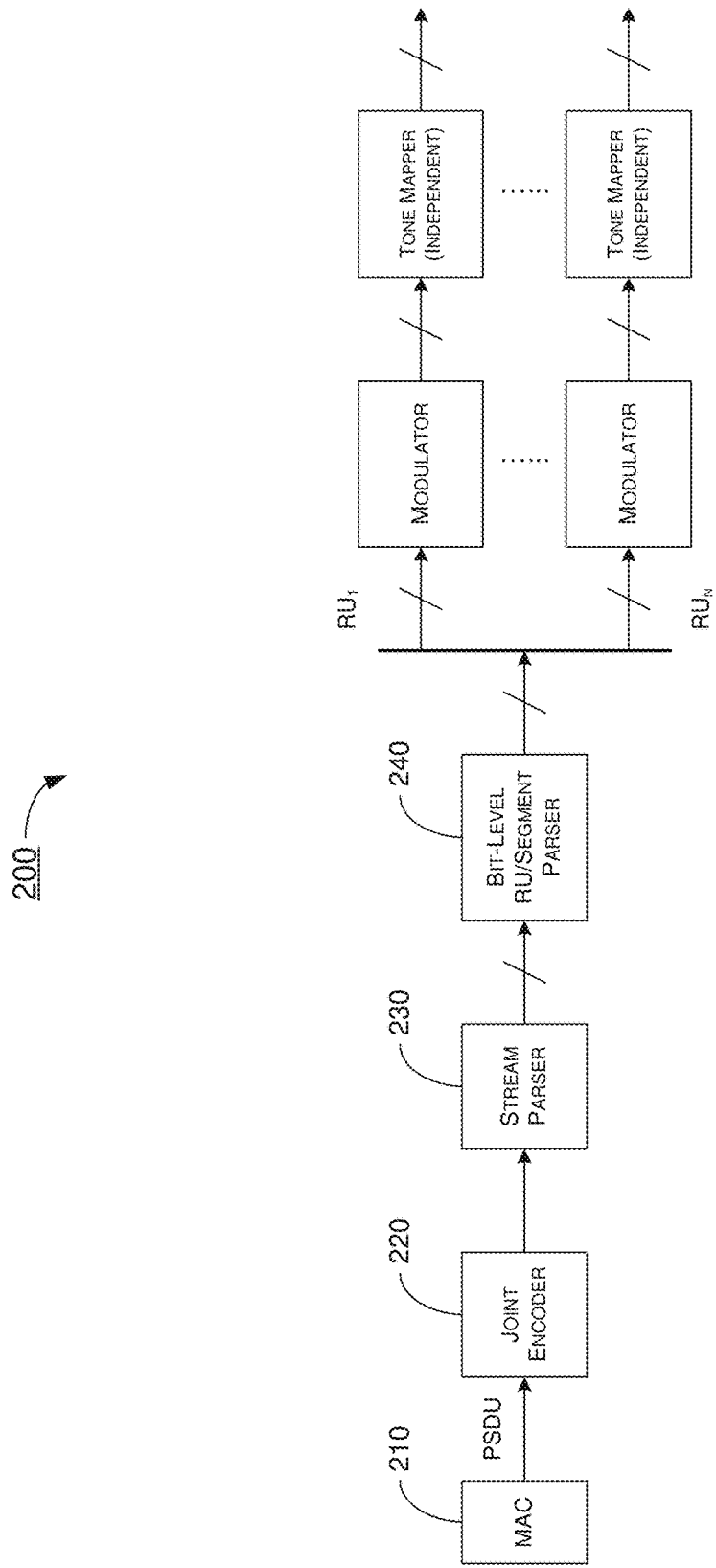
FIG. 2 is a diagram of an example design in accordance with the present disclosure.

FIG. 2 illustrates an example design 200 in accordance with the present disclosure. In general, a fundamental operation of multi-RU transmission may involve a number of operations described below with reference to FIG. 2. For instance, data for one STA (e.g., STA 110) to be transmitted over multiple RUs using one physical layer (PHY) service data unit (PSDU) may be provided by a medium access control layer (MAC) 210. Information bits for the multiple RUs may be jointly encoded by a joint encoder 220 to provide an encoded bit sequence to a stream parser 230 which may perform stream parsing to split or otherwise parse an input stream of encoded bits into different spatial streams. Then, depending on bandwidth and/or RU assignments and interleaving/tone-mapping schemes, a bit-level RU and segment (RU/segment) parser 240 may be operated per stream at bit level to allocate, distribute or otherwise parse the encoded bits onto each RU of the multiple RUs to be modulated and tone-mapped/interleaved for transmission on the assigned RUs.

Under a proposed scheme in accordance with the present disclosure, a simple RU parser scheme may be implemented in bit-level RU and segment parser 240 to achieve almost the same performance as a joint tone-mapper/interleaver. Moreover, under the proposed scheme, bit-level RU/segment parser 240 may be used for either equal or unequal quadrature amplitude modulation (QAM) assignments on each RU. Under the proposed scheme, a number of parameters for bit-level RU/segment parser 240 may be defined. For instance, a parameter $N_{sec}$ may denote a number of sectors, $N_{sec}$=4, 2 (with 1 or 0 being a special case). Another parameter $N_{bps}$ may denote a number of bits per sector as $$N_{bps} = \frac{vN_{cbpss}}{N_{sec}}.$$

Another parameter $N_{bps,r}$ may denote a number of bits per sector for an $r^{th}$ RU as $$N_{bps,r} = \frac{N_{cbpss,r}}{N_{sec}}.$$

Here, $N_{cbpss,r}$ may denote a number of coded bits per orthogonal frequency-division multiplexing (OFDM) symbol per stream for the $r^{th}$ RU, and $vN_{cbpss}$ may be defined for an aggregate RU of multiple RUs (herein interchangeably referred to as "virtual RU" or "combined RU") as $$vN_{cbpss} = \sum_{r}^{Nru} N_{cbpss,r}.$$

It is noteworthy that the various proposed schemes described herein pertaining to optimization of RU and segment parser design for aggregated and multi-RU operations in EHT systems may be implemented in bit-level RU/segment parser 240.

Figure 3:
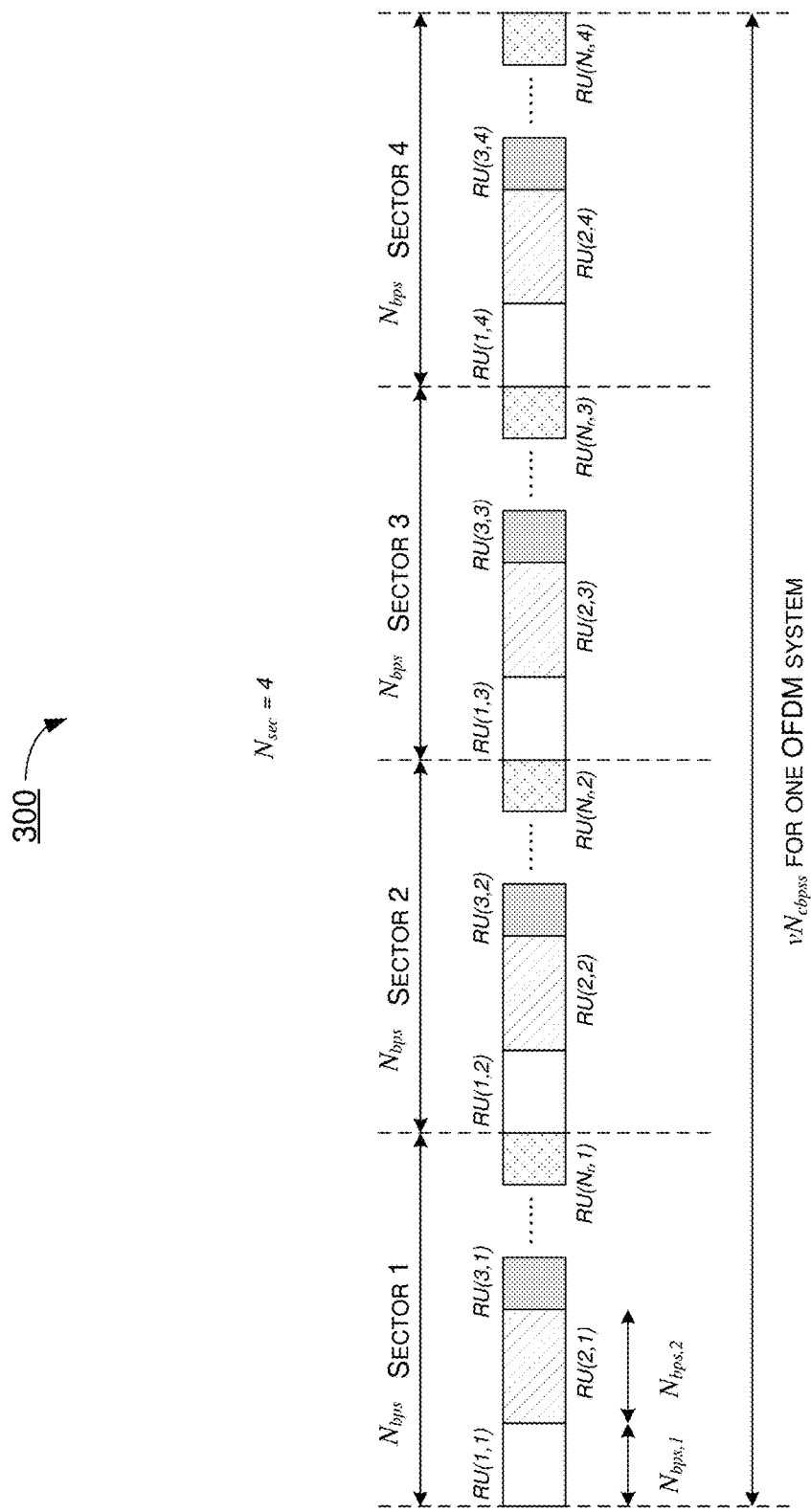
FIG. 3 is a diagram of an example scenario in accordance with the present disclosure.

FIG. 3 illustrates an example scenario 300 in accordance with the present disclosure. In scenario 300, with $N_{sec}=4$, the bit index of an output of a RU parser in accordance with the present disclosure for RU-r may be expressed as:

$$k_1 = (n-1)*N_{bps} + j, \text{ for } RU-1,$$

$$\text{where } j = 0, \ldots, N_{bps,1} - 1, n = 1, \ldots, N_{sec}$$

$$k_r = \sum_{i=1}^{r-1} N_{bps,i} + (n-1)*N_{bps} + j, \text{ for } RU-r, r = 2, \ldots, N_{ru},$$

$$\text{where } j = 0, \ldots, N_{bps,1} - 1, n = 1, \ldots, N_{sec}$$

In scenario 300, RU(r, m) stands for the $r^{th}$ RU in the $m^{th}$ sector.

Figure 4:
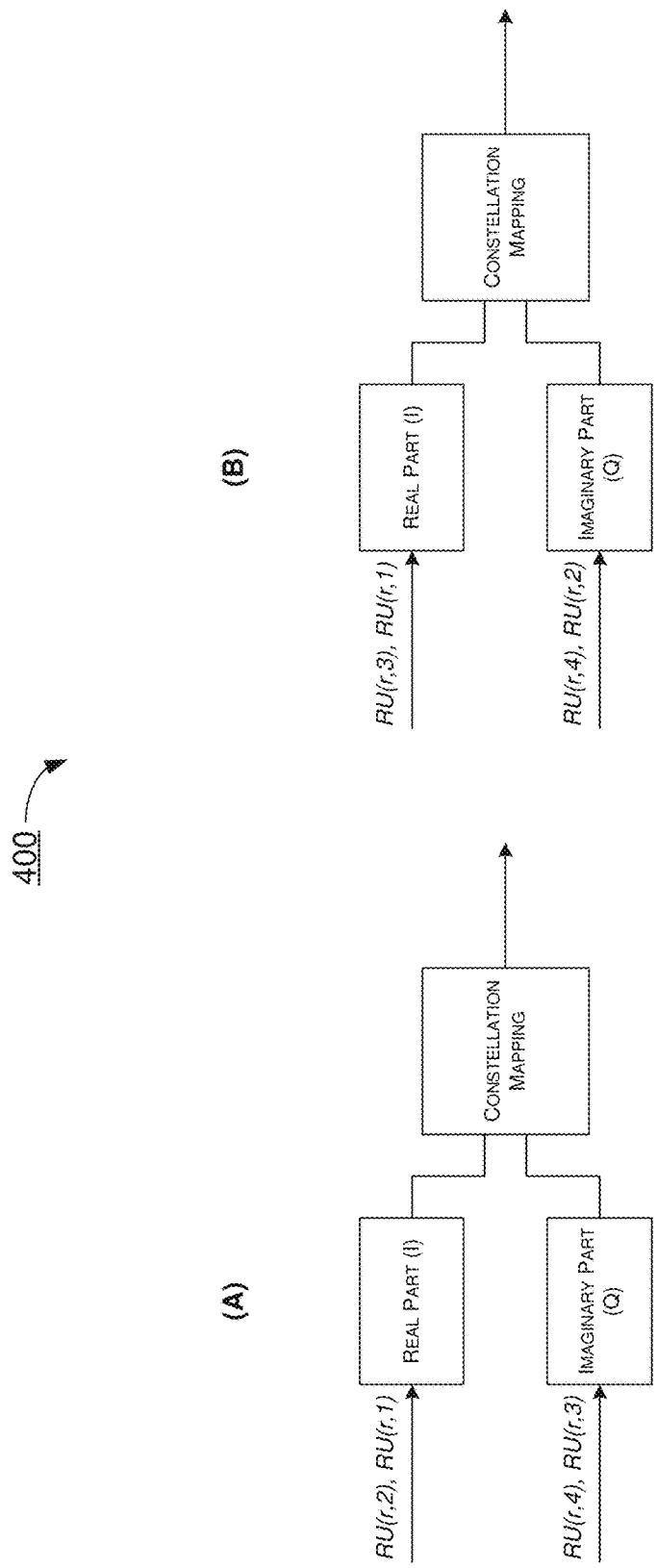
FIG. 4 is a diagram of an example design in accordance with the present disclosure.

FIG. 4 illustrates an example design 400 in accordance with the present disclosure. In design 400 of a proposed RU/segment parser at bit level, $N_{sec}=4$. For each RU, the output of a RU parser in accordance with the present disclosure may be arranged as an input into constellation mapping in either of two options, namely option 1 and option 2. Part (A) of FIG. 4 shows an arrangement under option 1, and part (B) of FIG. 4 shows an arrangement under option 2. It is noteworthy that $N_{sec}=4$ may be used for any QAM on any RU except for binary phase shift keying (BPSK) on some RUs (e.g., RU242 or RU106I). For BPSK, $N_{sec}=2$ may be used instead as described below.

Figure 5:
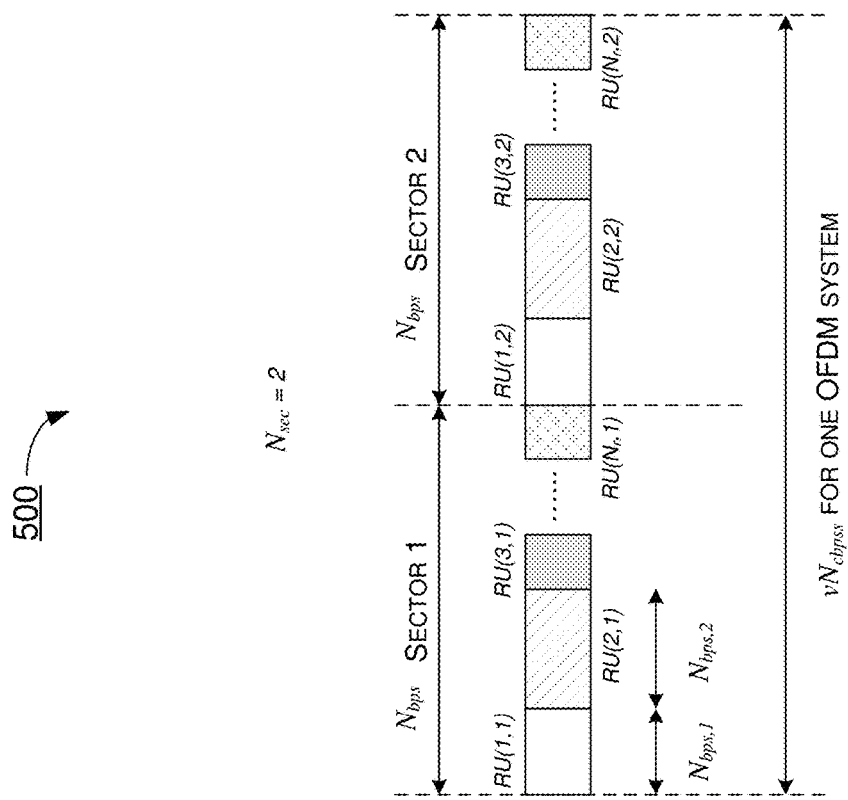
FIG. 5 is a diagram of an example scenario in accordance with the present disclosure.

FIG. 5 illustrates an example scenario 500 in accordance with the present disclosure. In scenario 500, with $N_{sec}=2$, the bit index of an output of a RU parser in accordance with the present disclosure for RU-r may be expressed as:

$$k_1 = (n-1)*N_{bps} + j, \text{ for } RU-1,$$

$$\text{where } j = 0, \ldots, N_{bps,1} - 1, n = 1, \ldots, N_{sec}$$

$$k_r = \sum_{i=1}^{r-1} N_{bps,i} + (n-1)*N_{bps} + j, \text{ for } RU-r, r = 2, \ldots, N_{ru},$$

$$\text{where } j = 0, \ldots, N_{bps,1} - 1, n = 1, \ldots, N_{sec}$$

In scenario 500, RU(r, m) stands for the $r^{th}$ RU in the $m^{th}$ sector.

Figure 6:
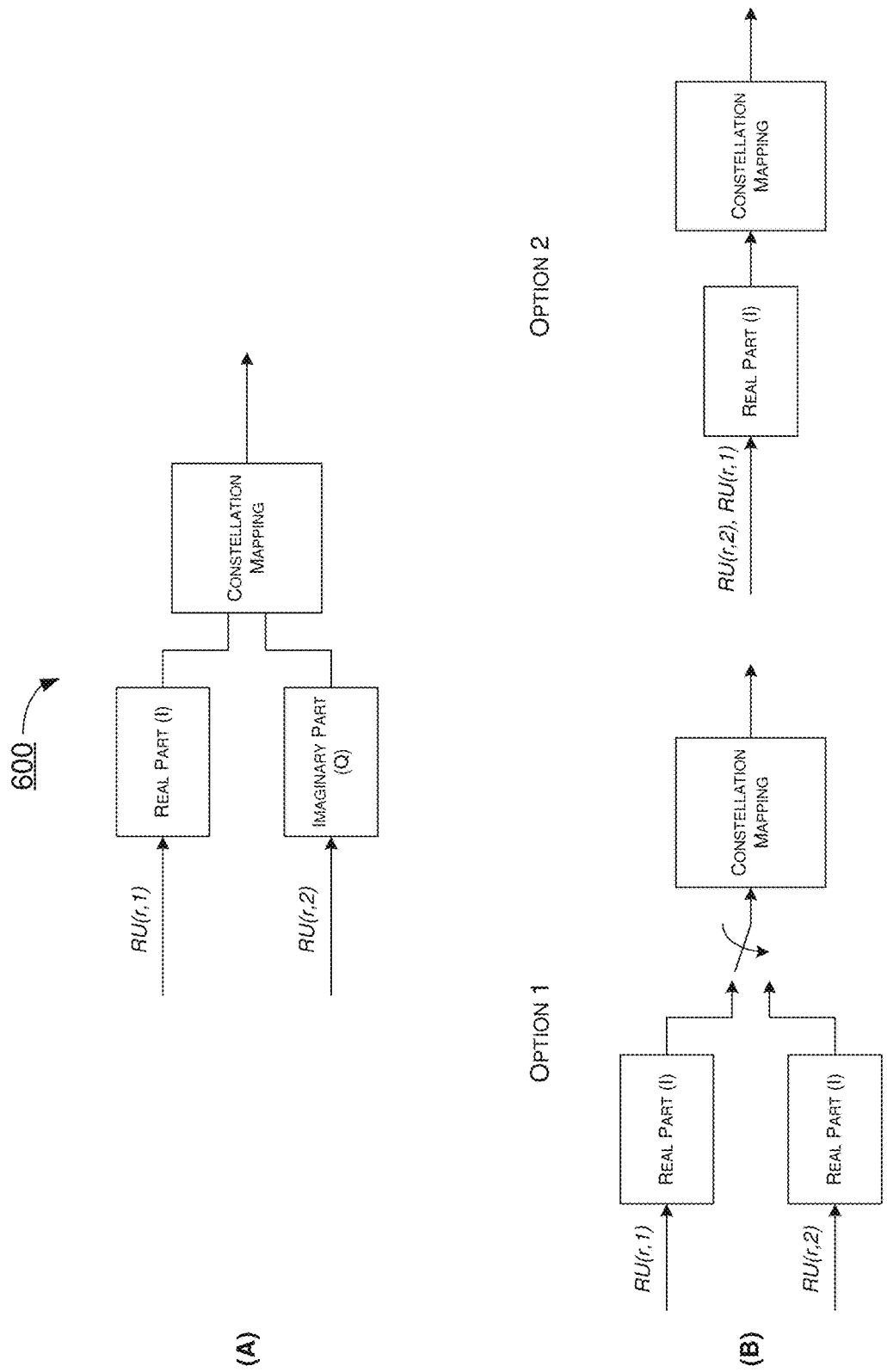
FIG. 6 is a diagram of an example design in accordance with the present disclosure.

FIG. 6 illustrates an example design 600 in accordance with the present disclosure. In scenario 600, $N_{sec}=2$. For each RU, the output of a RU parser in accordance with the present disclosure may be arranged as an input into constellation mapping depending on whether QAM or BPSK is applied. Part (A) of FIG. 6 shows an arrangement for QAM higher than BPSK, and part (B) of FIG. 6 shows an arrangement for BPSK under either of two options, namely option 1 and option 2.

Figure 7:
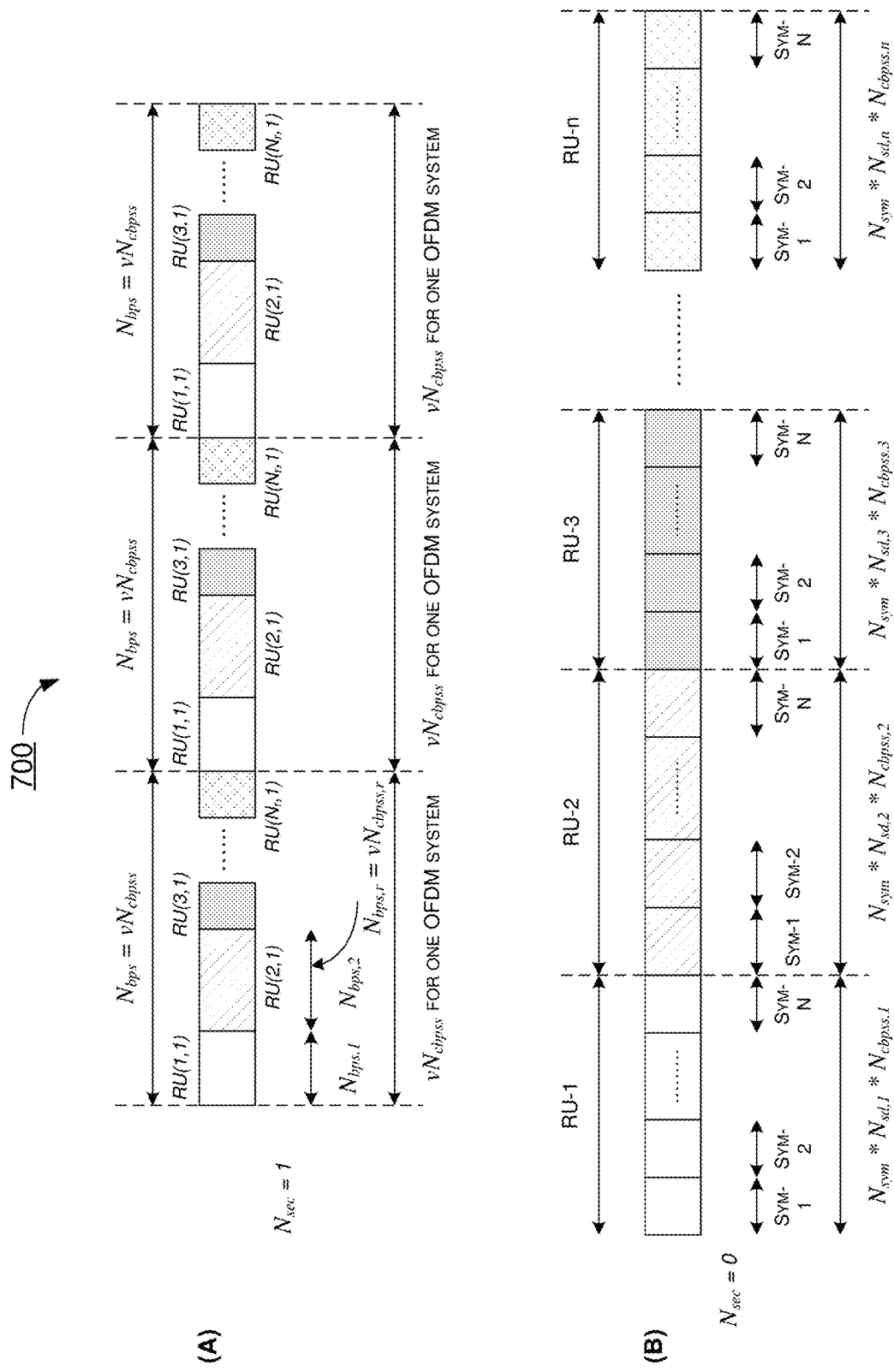
FIG. 7 is a diagram of example scenarios in accordance with the present disclosure.

FIG. 7 illustrates example scenarios 700 and 750 in accordance with the present disclosure. In scenario 700, $N_{sec}=1$. In scenario 750, $N_{sec}=0$.

It is noteworthy that the proposed schemes for RU/segment parser design may be applied to unequal QAM assigned to individual RUs. Additionally, in the present disclosure, the term "RU" may also refer to a "virtual RU" or a "combined RU". Moreover, the bit-level RU/segment parser in accordance with the present disclosure may be used with an independent low-density parity-check (LDPC) tone-mapper for regular RUs or virtual RUs.

In next-generation EHT systems (e.g., in compliance with IEEE 802.11 be), both wider bandwidths 240 MHz and 320 MHz as well as aggregated RU are supported. Under a proposed scheme in accordance with the present disclosure, legacy system (e.g., in compliance with IEEE 802.11ac and/or 802.11/ax) hardware may be reused in implementing a RU and segment parser for aggregated RU and wider-bandwidth operations. Thus, a segment parser or a mixed-RU/segment parser under the proposed scheme may be used for full-bandwidth or non-orthogonal frequency-division multiple access (OFDMA)/OFDMA multi-RU over bandwidths of 240 MHz (or 160+80 MHz) and 320 MHz (or 160+160 MHz) transmissions with more than one 996-tone RU (herein interchangeably referred to as "RU996") aggregated. In addition, under two proposed schemes in accordance with the present disclosure, multi-RU operations in various bandwidths (e.g., 80 MHz, 160 MHz, 240 MHz and 320 MHz) may be enhanced. One such proposed scheme may involve a new RU parser using a larger number of sectors to further improve system performance. The other proposed scheme may involve "quasi-joint" tone mapper by using a larger distance of separation between tones ($D_{TM}$), as the larger the $D_{TM}$ is the better the system performance becomes in general. It is noteworthy that, in the present disclosure, an X-tone RU is denoted as "RUX" (e.g., a 484-tone RU is denoted as "RU484" and a 996-tone RU is denoted as "RU996", and so forth).

In IEEE 802.11ax, for 160-MHz and 80-MHz transmissions with two 996-tone RUs, output bits of each stream parser are first divided into blocks of $N_{cbpss}$ bits ($N_{cbpss,u}$ bits in the case of a multi-user transmission with u denoting the number of users). Then, each block is further divided into two frequency subblocks of $N_{cbpss}/2$ bits as follows:

$$y_{k,l} = x_m$$

$$m = 2s \cdot \left\lfloor \frac{k}{s} \right\rfloor + l \cdot s + (k \text{ mod } s), k = 0, 1, \ldots, \frac{N_{CBPSS}}{2} - 1$$

Here, $x_m$ denotes bit m of a block of $N_{cbpss}$ bits and m=0, ... $N_{cbpss}-1$, l denotes the frequency subblock index and l=0, 1, and $y_{k,l}$ denotes bit k of the frequency subblock l, where $$s = \max\left(1, \frac{N_{BPSCS}}{2}\right).$$

Under a proposed scheme in accordance with the present disclosure, the IEEE 802.11ax segment parser may be extended for 240 MHz and 320 MHz, 160+80 MHz and 160+160 MHz. As with IEEE 802.11ax, under the proposed scheme, each segment may be defined as a 80-MHz segment. Additionally, the number of segments $N_{seg}=3$ may be defined for transmission over 240 MHz and 160+80 MHz with three 996-tone RUs, and the number of segments $N_{seg}=4$ may be defined for transmission over 320 MHz and 160+160 MHz with four 996-tone RUs, as follows:

$$y_{k,l} = x_m$$

$$m = N_{seg} \cdot s \cdot \left\lfloor \frac{k}{s} \right\rfloor + l \cdot s + (k \text{ mod } s), k = 0, 1, \ldots, \frac{N_{CBPSS}}{N_{seg}} - 1$$

Here, $x_m$ denotes bit m of a block of $N_{cbpss}$ bits and m=0, ... $N_{cbpss}$−1, l denotes the frequency subblock index and l=0, ..., $N_{seg}$−1, and $y_{k,l}$ denotes bit k of the frequency subblock l, where $$s = \max\left(1, \frac{N_{BPSCS}}{2}\right).$$

It is noteworthy that $N_{seg}$=2 may be for a case of two 996-tone RUs as in IEEE 802.11ax.

Figure 9:
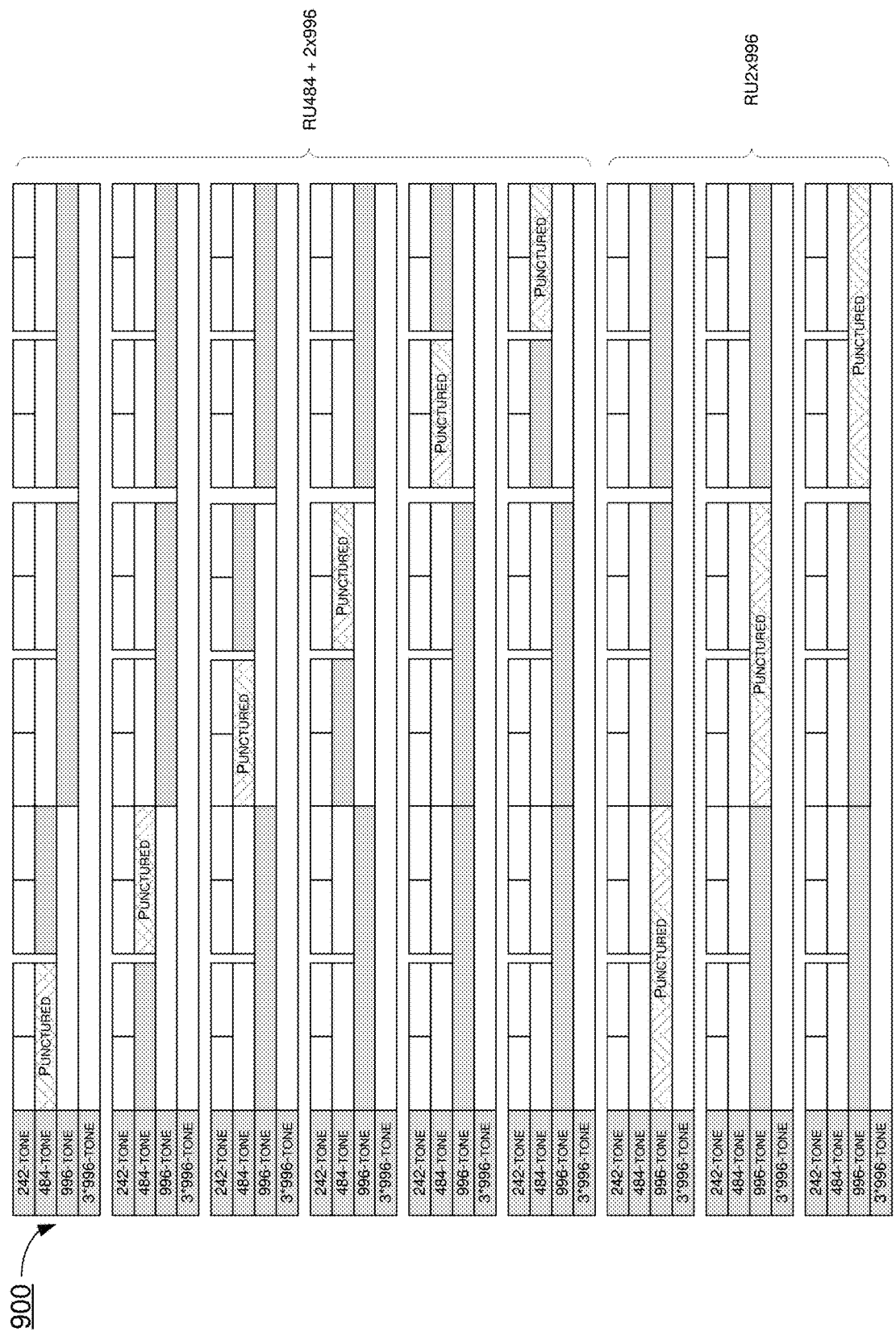
FIG. 9 is a diagram of an example scenario in accordance with the present disclosure.
Figure 10:
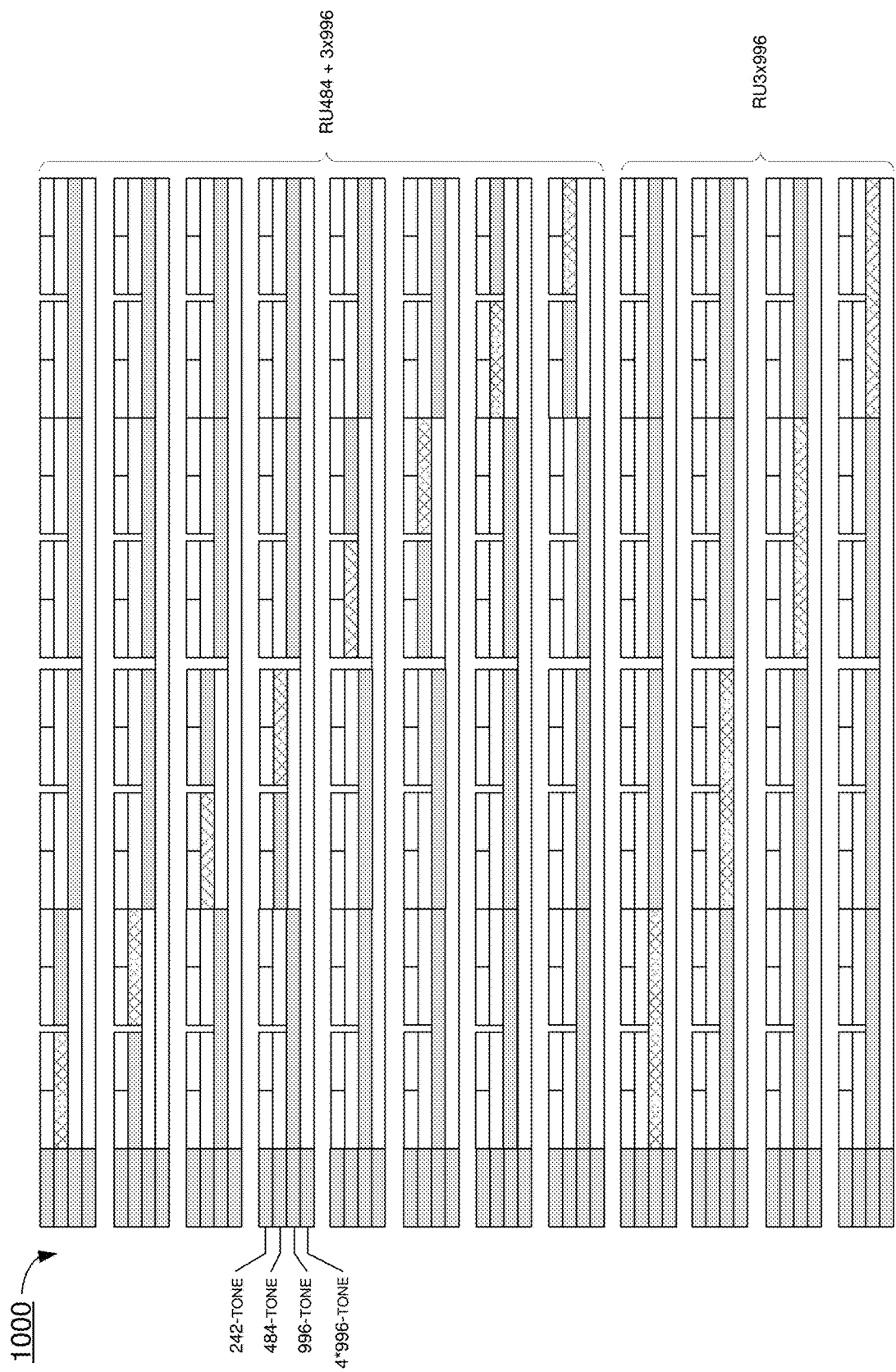
FIG. 10 is a diagram of an example scenario in accordance with the present disclosure.

FIG. 8 illustrates an example scenario 800 of full bandwidth of 240/160+80 MHz and full bandwidth of 320/160+160 MHz in accordance with the present disclosure. FIG. 9 illustrates an example scenario 900 of RU combinations for Physical Layer Convergence Procedure (PLCP) protocol data unit (PPDU) in 240 MHz in accordance with the present disclosure. FIG. 10 illustrates an example scenario 1000 of RU combinations for PPDU in 320 MHz in accordance with the present disclosure.

Figure 11:
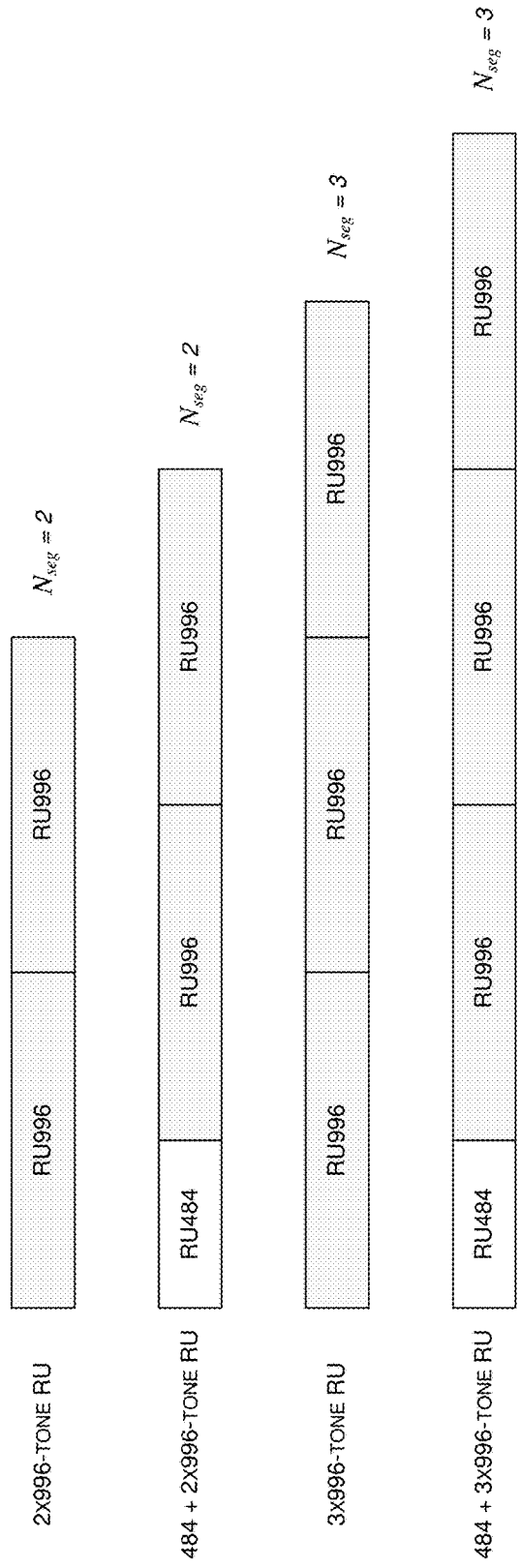
FIG. 11 is a diagram of an example scenario in accordance with the present disclosure.

FIG. 11 illustrates an example scenario 1100 of generalized RU combination patterns for PPDU in 240 MHz and 320 MHz in accordance with the present disclosure. In scenario 1100, an illustrative example of bandwidth aggregation of multi-RU (e.g., a number of RU996 or 80-MHz segments) is shown. It is noteworthy that, in actual implementations, the multiple RUs may not necessarily be adjacent to each other. Referring to FIG. 11, in the case of 2×996-tone RU, a segment parser may be utilized per stream, per symbol, with $N_{seg}$=2. In the case of 484+2×996-tone RU, a mixed RU/segment parser may be utilized per stream, per symbol. Under a proposed scheme, encoded bits with number bits of RU484 associated $N_{cbpss}$ may be provided to a QAM mapper for RU484. A segment parser may be utilized with $N_{seg}$=2 for the remaining encoded bits in one OFDM symbol. Each segment of segment parser may go through a QAM mapper and an LDP tone mapper. In the case of 3×996-tone RU, a segment parser may be utilized per stream, per symbol, with $N_{seg}$=3. In the case of 484+3×996-tone RU, a mixed RU/segment parser may be utilized per stream, per symbol. Under a proposed scheme, encoded bits with number bits of RU484 associated $N_{cbpss}$ may be provided to a QAM mapper for RU484. A segment parser may be utilized with $N_{seg}$=3 for the remaining encoded bits in one OFDM symbol. Each segment of segment parser may go through a QAM mapper and an LDP tone mapper.

For the cases of 2×996-tone and 3×996-tone RU combination cases, the segment parser under a proposed scheme in accordance with the present disclosure may be described as follows:

$$y_{k,l} = x_m$$

$$m = N_{seg} * s * \left\lfloor \frac{k}{s} \right\rfloor + l*s + (k \bmod s) \quad k = 0, 1, \ldots, \frac{vN_{cbpss}}{N_{seg}} - 1$$

Here, $$s = \max\left(1, \frac{N_{bpscs}}{2}\right)$$

and $$vN_{cbpss} = \sum_r^{N_{ru}} N_{cbpss,r}.$$

Moreover, l denotes a frequency subblock or segment index, l=0, 1, ... $N_{seg}$−1, and $N_{cbpss,r}$ denotes the $N_{cbpss}$ for the $r^{th}$ RU.

For the cases of 484+2×996-tone and 484+3×996-tone RU combination cases, the segment parser under a proposed scheme in accordance with the present disclosure may be described below.

For RU484 (assuming $N_{cbpss,1}$ corresponding to RU484):

$$y_k = x_m, \, m=0,1,\ldots,N_{cbpss,1}$$

For $N_{seg}$*996 RU:

$$y_{k,l} = x_m$$

$$m = N_{cbpss,1} + N_{seg} * s * \left\lfloor \frac{k}{s} \right\rfloor + l*s + (k \bmod s),$$

$$k = 0, 1, \ldots, \frac{vN_{cbpss} - N_{cbpss,1}}{N_{seg}} - 1$$

Figure 12:
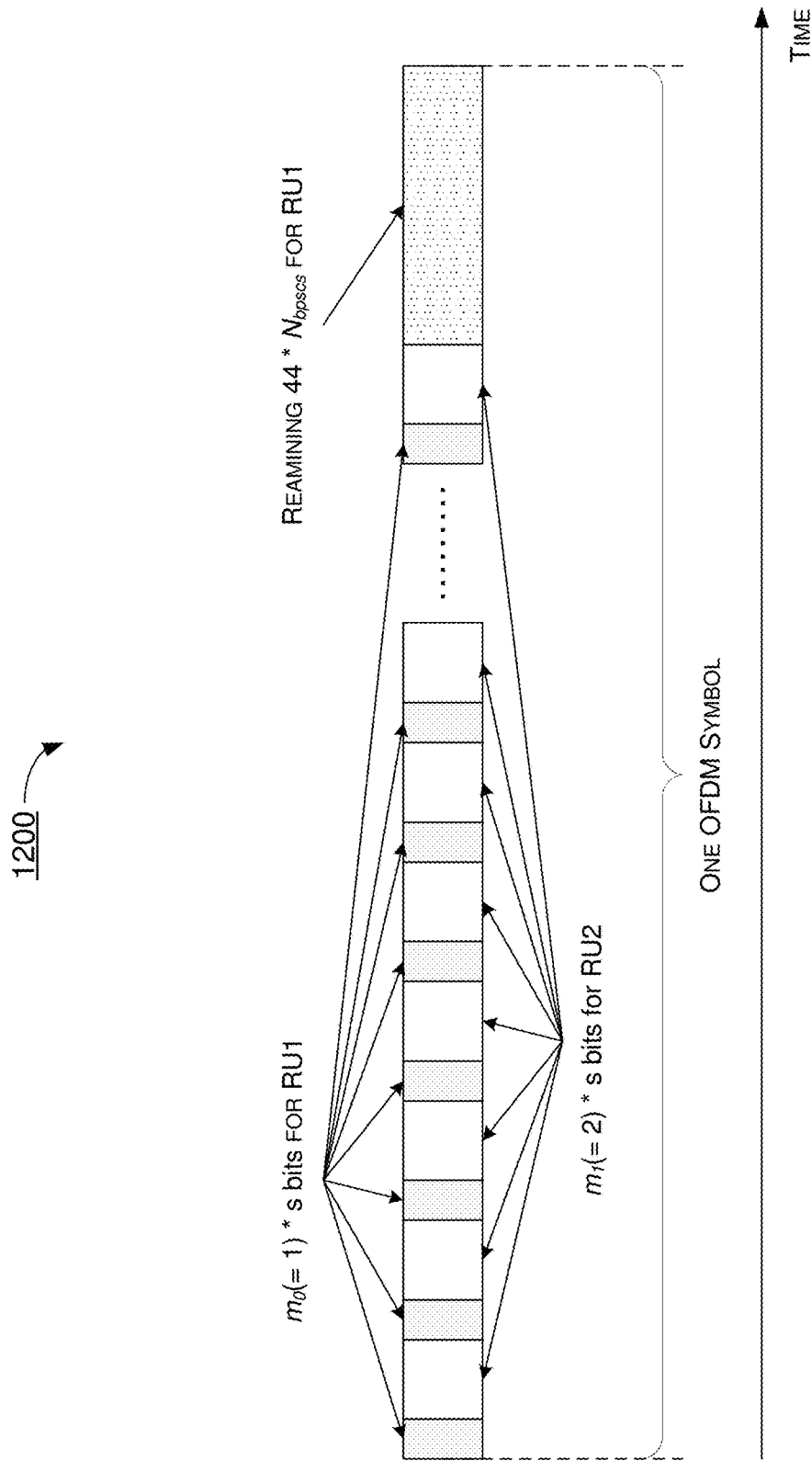
FIG. 12 is a diagram of an example scenario in accordance with the present disclosure.

Under a proposed scheme in accordance with the present disclosure, an alternative or ping-pong style of RU parser may be utilized for different RU combination scenarios (such as 80 MHz/160 MHz/80+80 MHz/240 MHz/160+80 MHz/320 MHz/160+160 MHz). Under the proposed scheme, the RU parser may be related to each RU size (e.g., number of tones in the RU) or a ratio between the RUs within an aggregated (virtual) RU. For instance, assuming a ratio of the number of tones or data subcarriers ($N_{sd}$) between the RUs to be combined can be expressed as $N_{sd,1}$:$N_{sd,2}$:$N_{sd,3}$: . . . which may be approximated by m0:m1:m2: . . . with $m_i$ being an integer in unit of s-bits, 0 number of RUs combined −1. Thus, in the present disclosure, each expression of ratio such as m0: . . . :mn may be interchangeably replaced with an alternative expression of 1s: . . . :ns, with n>1. Additionally, it may be assumed that the same QAM is assigned to each RU (e.g., a number of coded bits per single carrier for each spatial stream ($N_{bpscs}$) per tone). Under the proposed scheme, the RU parser may be operated either across or within each 80-MHz frequency segment. In case there are two RUs combined within a given 80-MHz frequency segment, the two RUs may be considered and treated as one virtual RU or as two individual RUs. The RU parser may be utilized or otherwise operated at the output of a stream parser per OFDM symbol and per stream. The bits may be assigned to each RU alternatively with $m_i$*s bits to $RU_i$. The number of remaining bits may be assigned to a specific RU. For instance, given two RUs aggregated with a 484-tone RU (as RU1) and a 996-tone RU (as RU2), the proposed scheme may configure m0=1 and m1=2. Then, the first m0 s bits may be assigned to RU1, m1*s bits to RU2, m0 s bits to RU1, m1*s bits to RU2, and so on. After $N_{sec}$=936 times of alternative assignments, the remaining 44*$N_{bpscs}$ bits may be assigned to RU2. FIG. 12 illustrates an example scenario 1200 as an illustrative implementation in accordance with the present disclosure. FIG. 13 illustrates an example scenario 1300 in accordance with the present disclosure. Referring to FIG. 13, a table shows a set of example $m_i$ ratio configurations for different RU aggregations. It is noteworthy that the general concept of this RU parser under the proposed scheme may also be applied to other $m_i$ values or to other RU combination scenarios.

Under a proposed scheme in accordance with the present disclosure, a "quasi-joint" tone mapper may be utilized for multi-RU operations. The performance of joint tone mapper may depend on the parameter $D_{TM}$. For some RU combinations across a 80-MHz frequency segment, the size of $D_{TM}$ may be limited. For example, for RU484+996, the total number of data subcarriers, or tones, for the aggregated RU ($vN_{sd}$)=468+980=1448; factor(1448)=[2 2 2 181]; maximum $D_{TM}$=8. As another example, for RU(242+484)+996, $vN_{sd}$=234+468+980=1682; factor(1682)=[2 29 29]; maximum $D_{TM}$=29.

To improve performance of the joint tone mapper, a "quasi-joint" tone mapper may be utilized by keeping one or more tones (herein interchangeably referred to as "dropped tones") in "fixed" (or "predefined") locations with the remaining tones passing through a joint-tone mapper. For example, for RU484+996, four tones may be dropped ($N_{drop}$=4) with 1444 tones going through a joint-tone mapper, then factor(1444)=[2 2 19 19], with $D_{TM}$=38 (or another value). For RU(242+484)+996, two tones may be dropped ($N_{drop}$=2) with 1680 tones going through a joint-tone mapper, then factor(1680)=[2 2 2 3 5 7], with $D_{TM}$=40 (or another value). FIG. 14 illustrates an example scenario 1400 in accordance with the present disclosure. Referring to FIG. 14, a table shows a set of ($N_{drop}$, $D_{TM}$) configurations for different RU combinations. It is noteworthy that the general concept of this RU parser under the proposed scheme may also be applied to other settings of ($N_{drop}$, $D_{TM}$).

Figure 15:
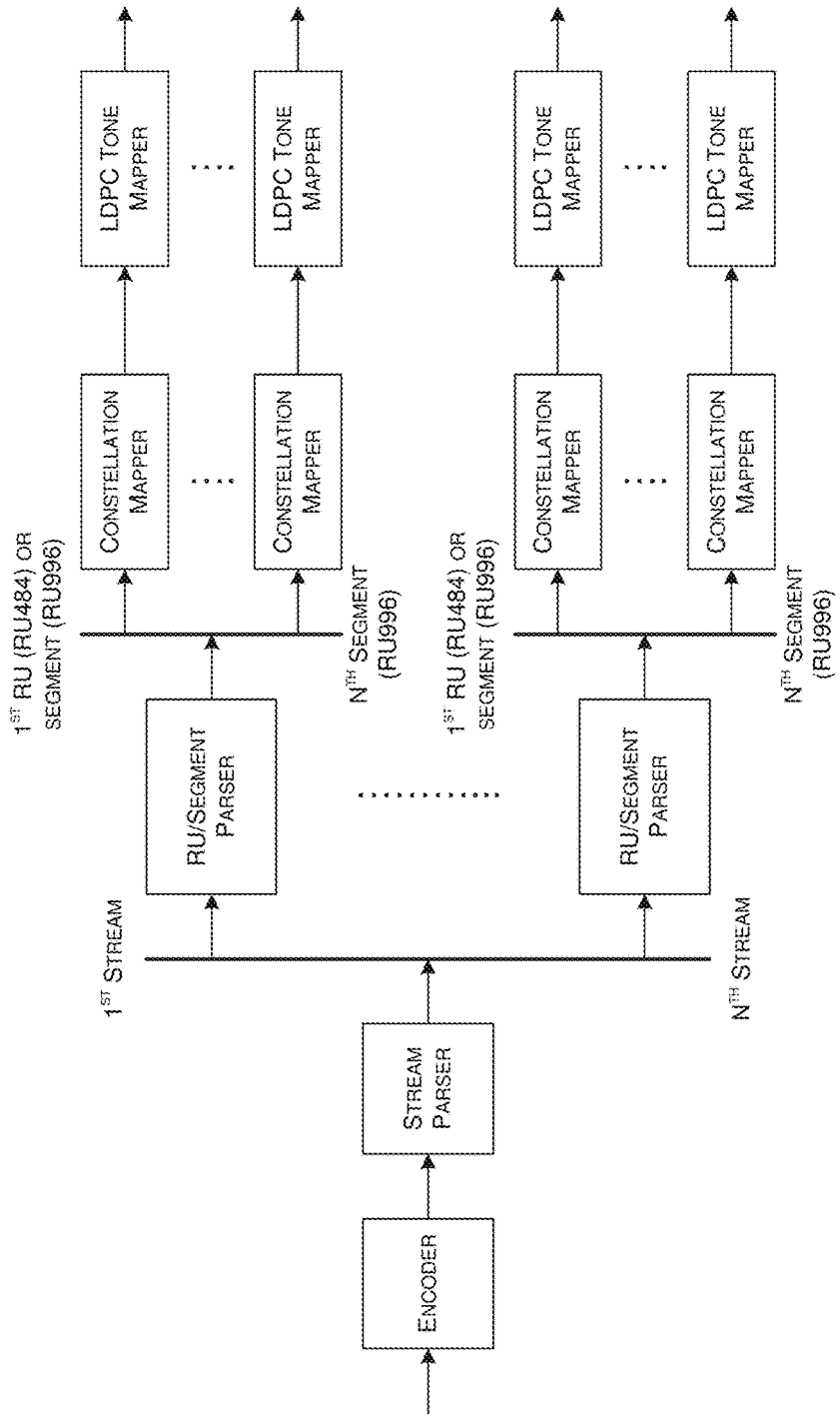
FIG. 15 is a diagram of an example design in accordance with the present disclosure.

FIG. 15 illustrates an example design 1500 in accordance with a proposed scheme of the present disclosure. In design 1500, a processing flow of aggregated RUs may be implemented with RU/segment parsers in bandwidths of 240 MHz and 320 MHz in accordance with the present disclosure.

Figure 16:
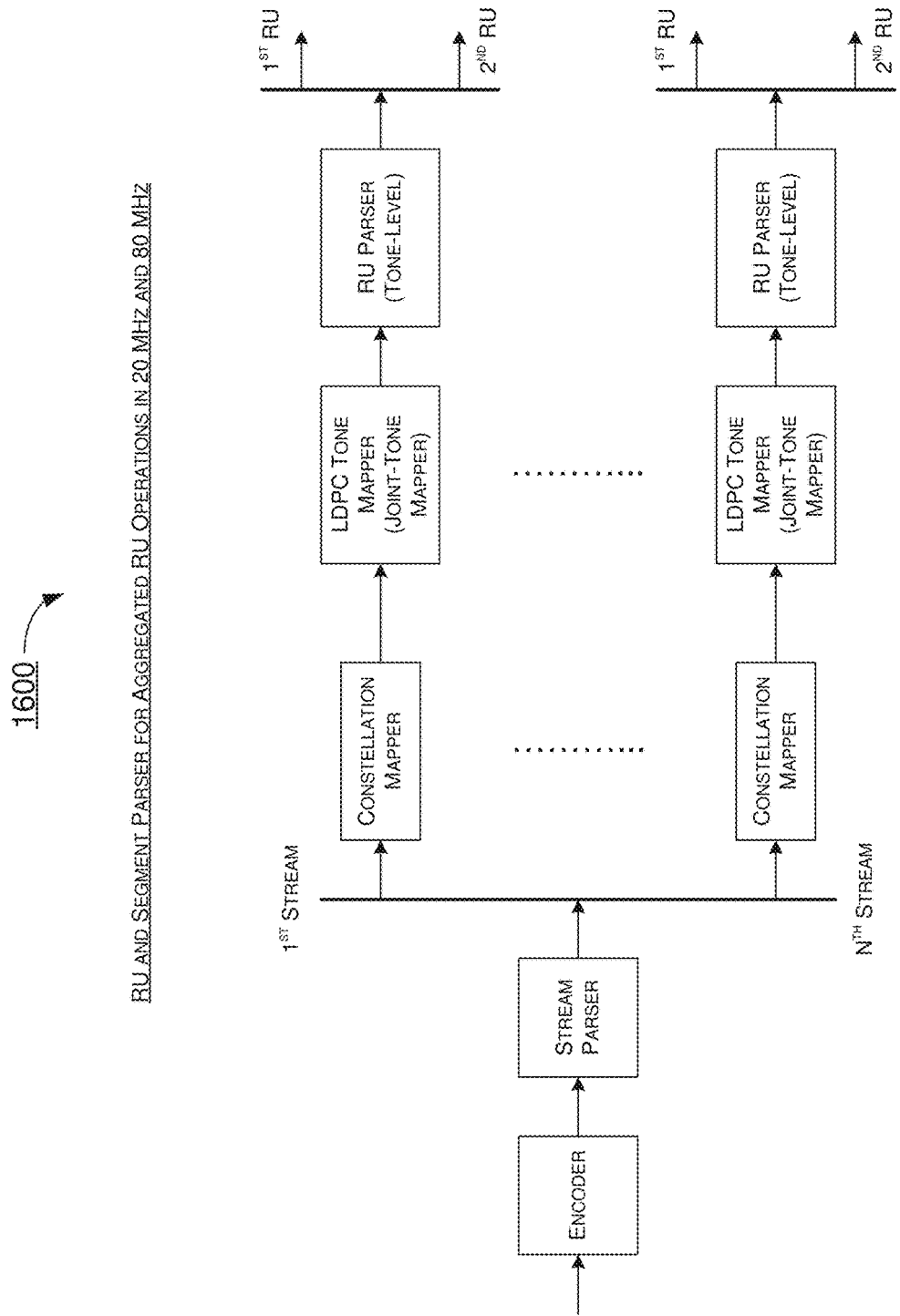
FIG. 16 is a diagram of an example design in accordance with the present disclosure.

FIG. 16 illustrates an example design 1600 in accordance with a proposed scheme of the present disclosure. In design 1600, a processing flow of aggregated RUs may be implemented with tone-level RU parsers with LDPC tone mappers, which may be joint mappers, in bandwidths of 20 MHz and 80 MHz in accordance with the present disclosure. Under the proposed scheme, in 20 MHz, the combinations of RU26+RU52 and RU26+RU106, but not other combinations, may be allowed. In 80 MHz, the combination of RU242+RU484, but not other combinations, may be allowed.

Figure 17:
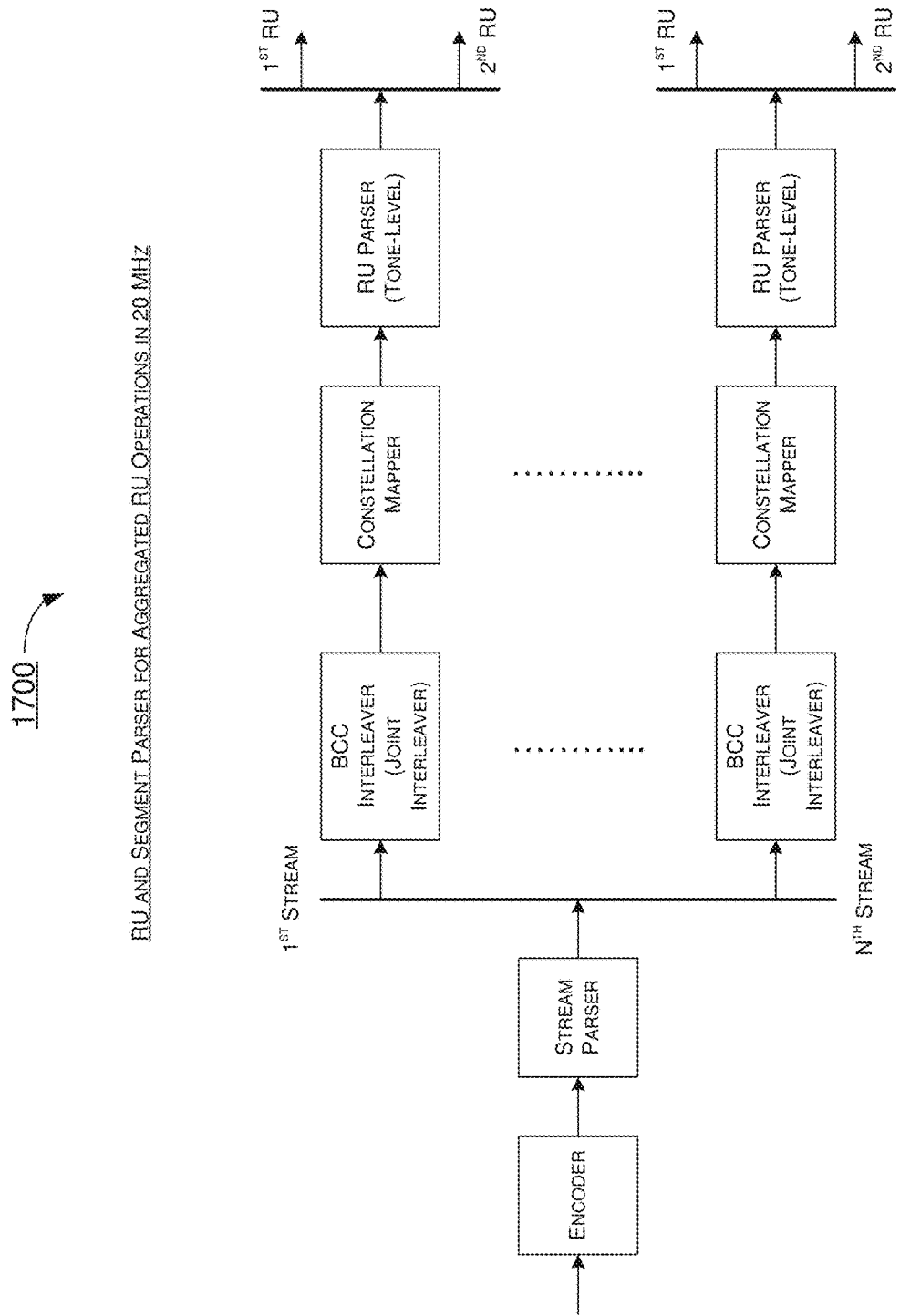
FIG. 17 is a diagram of an example design in accordance with the present disclosure.

FIG. 17 illustrates an example design 1700 in accordance with a proposed scheme of the present disclosure. In design 1700, a processing flow of aggregated RUs may be implemented with tone-level RU parsers with binary convolutional codes (BCC) interleavers, which may be joint interleavers, in bandwidth of 20 MHz in accordance with the present disclosure. Under the proposed scheme, in 20 MHz, the combinations of RU26+RU52 and RU26+RU106, but not other combinations, may be allowed.

Figure 18:
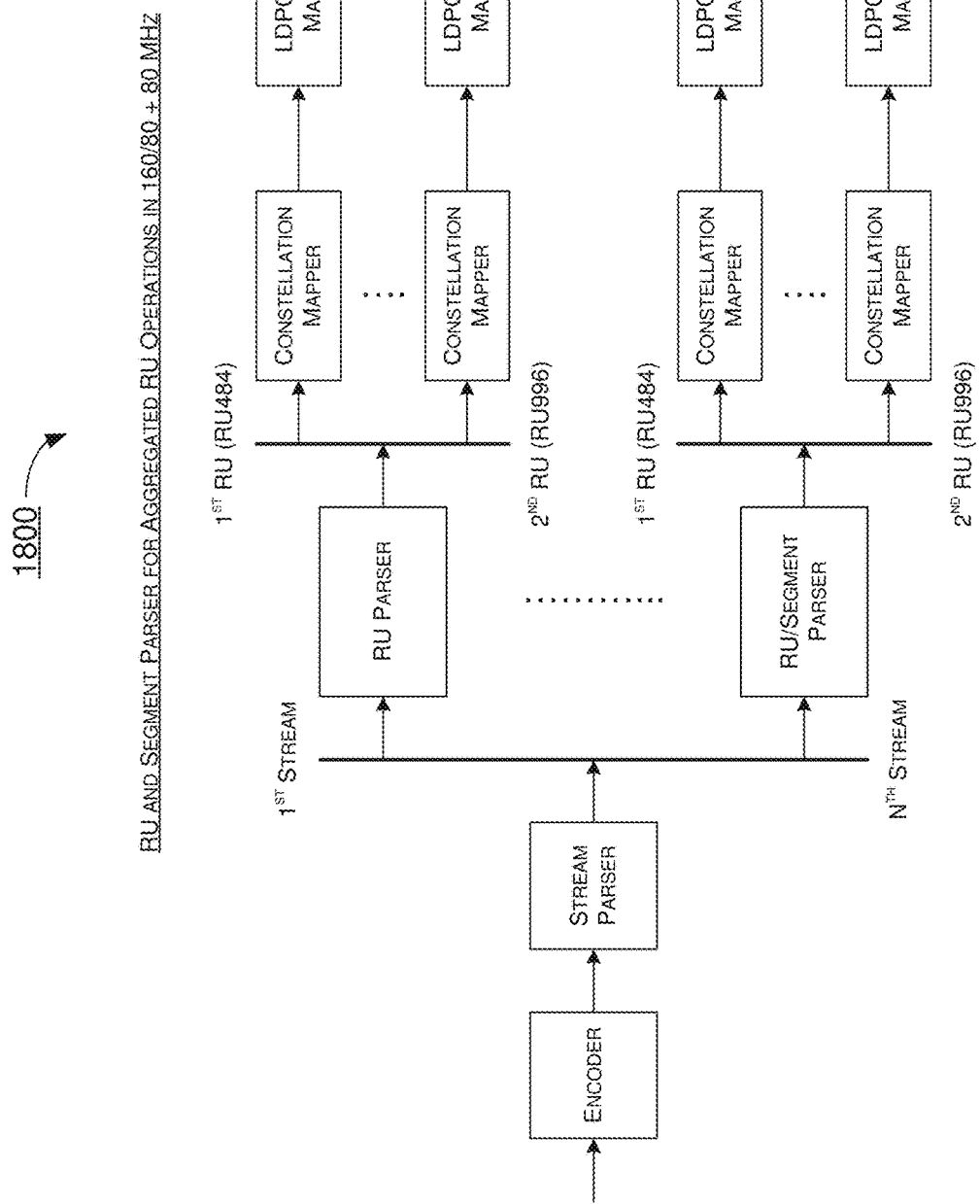
FIG. 18 is a diagram of an example design in accordance with the present disclosure.

FIG. 18 illustrates an example design 1800 in accordance with a proposed scheme of the present disclosure. In design 1800, a processing flow of aggregated RUs may be implemented with RU parser(s) and RU/segment parser(s) in bandwidths of 160 MHz and 80+80 MHz in accordance with the present disclosure. In the example shown in FIG. 18, design 1800 may be utilized for aggregation of a 484-tone RU and a 996-tone RU.

Figure 19:
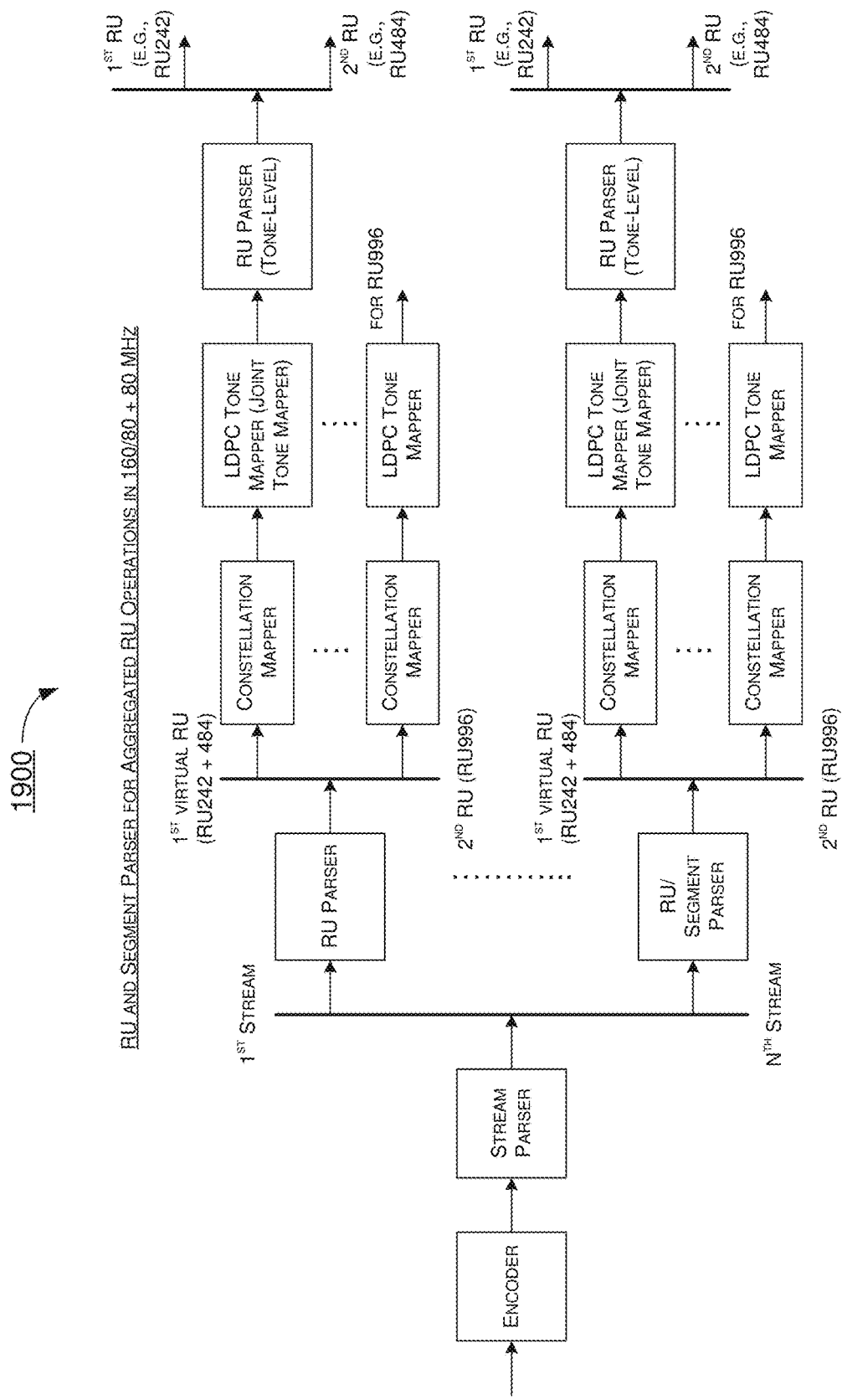
FIG. 19 is a diagram of an example design in accordance with the present disclosure.

FIG. 19 illustrates an example design 1900 in accordance with a proposed scheme of the present disclosure. In design 1900, a processing flow of aggregated RUs may be implemented with RU parser(s) and RU/segment parser(s) in bandwidths of 160 MHz and 80+80 MHz in accordance with the present disclosure. In the example shown in FIG. 19, design 1900 may be utilized for aggregation of a 996-tone RU and an aggregation of a 242-tone and a 484-tone RU.

As described above, aggregated RU or multiple RUs (multi-RU) may be assigned to a single STA to improve spectral efficiency. Under a proposed scheme in accordance with the present disclosure, a tone mapper of multi-RU may be performed either per 80-MHz frequency segment or jointly across each 80-MHz frequency segment. Under the proposed scheme, in the approach of per-80-MHz frequency segment tone mapper, a proportional round-robin RU/segment parser with different round-robin ratios for each multi-RU combination may be utilized. Under the proposed scheme, in the approach of a joint tone mapper across each 80-MHz frequency segment, a "quasi-joint" tone mapper may be utilized.

With respect to the proportional round-robin parser, a parameter $s=\max\{1, N_{bpscs}/2\}$ (herein referred to as the "s-bits") may be defined, where $N_{bpscs}$ denotes the number of coded bits per subcarrier per spatial stream. Thus, the value of s-bits may depend on the type of modulation used as $N_{bpscs}$ varies depending on the type of modulation used (e.g., $N_{bpscs}$=2 for QPSK, $N_{bpscs}$=4 for 16QAM). Accordingly, parsing of coded bits to multiple RUs may be performed in a proportional round-robin fashion, with the parser ratio depending on the size (or number of tones) of each RU in the RU aggregation. For instance, the parser ratio may be defined in the format of m0:m1:m2 . . . (or 1s:2s:3s . . . ), and each of m0, m1 and m2 may be in unit of s-bits. The proportional round-robin parser may operate as follows: first the parser may parse m0 s-bits to a first RU (RU1), then parse m1 s-bits to a second RU (RU2), . . . and so on by alternatively distributing coded bits to each RU of multiple RUs. For some multi-RU combinations, in case there are remaining bits after alternatively allocating coded bits to each RU in the ratio of m0:m1: . . . (or 1s:2s: . . . ), the remaining (leftover) bits may be assigned to each RU of relatively larger size(s). Moreover, the remaining/leftover bits may be further alternatively distributed to larger RU(s) (in case a number of larger RU(s) is equal to or greater than 2) with 1:1 ratio (in unit of s-bits, in case the larger RUs have equal size) to further improve system performance. Otherwise, the remaining/leftover bits may be sequentially distributed to each of the larger RU(s).

Figure 20:
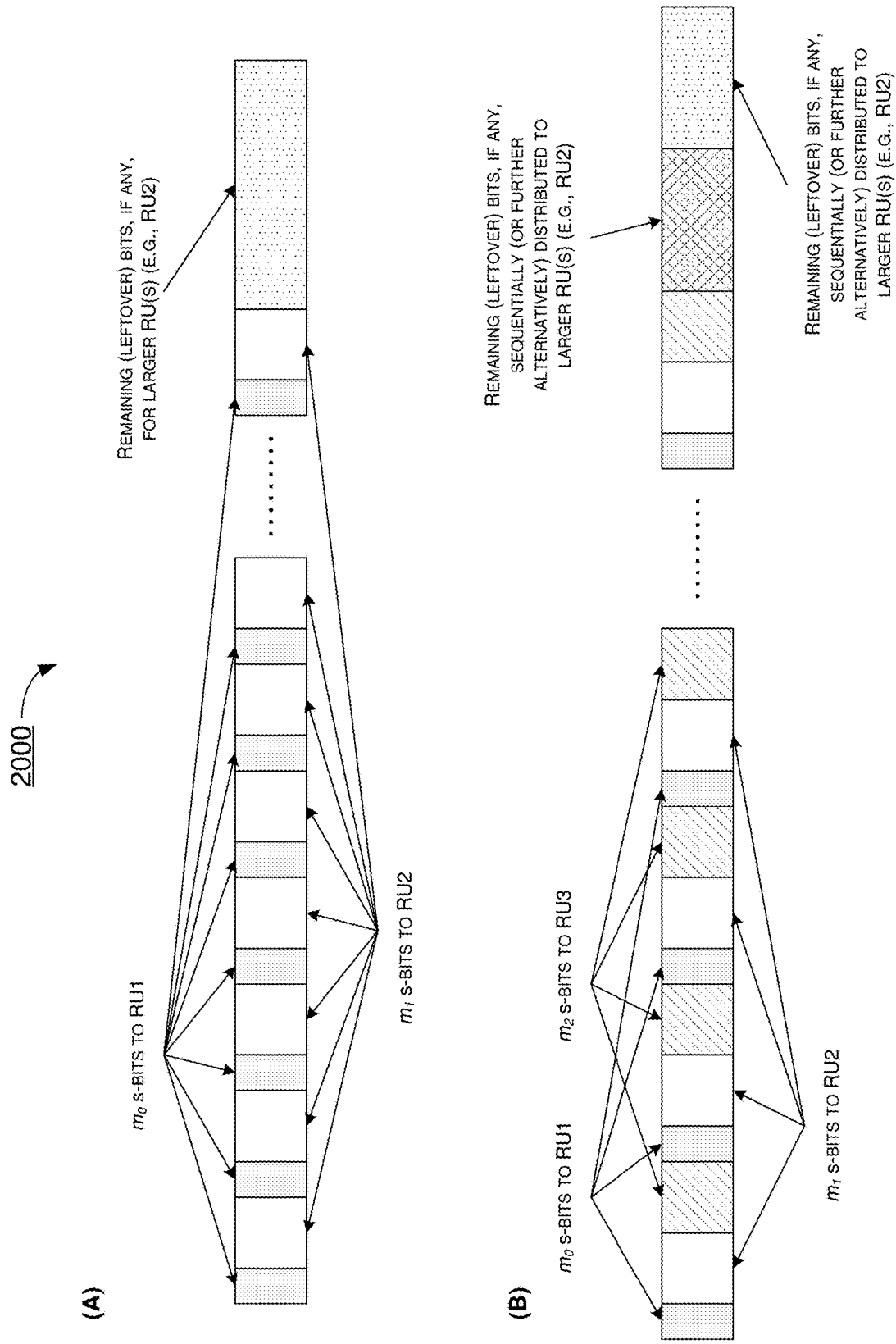
FIG. 20 is a diagram of an example scenario in accordance with the present disclosure.

FIG. 20 illustrates an example scenario 2000 of proportional round-robin parsing in accordance with a proposed scheme of the present disclosure. Part (A) of FIG. 20 shows an example of proportional round-robin parsing to two RUs, with each RU being in a respective 80-MHz frequency segment. In this example, the round-robin parsing may be performed with a ratio of m0:m1, with m1>m0 (or, alternatively, 1s:2s, with 2s>1s). It is noteworthy that, in case that the two RUs are in the same 80-MHz frequency segment, the two RUs may be treated together as one RU in the round-robin parser. As shown in part (A) of FIG. 20, leftover bits (if any) may be allocated or otherwise distributed to the larger RU between the two RUs (e.g., RU2). Part (B) of FIG. 20 shows an example of proportional round-robin parsing to three RUs, with each RU being in a respective 80-MHz frequency segment. In this example, the round-robin parsing may be performed with a ratio of m0:m1:m2, with m1>m0 and m1=m2 (or, alternatively, 1s:2s:2s, with 2s>1s and 2s=2s). As shown in part (B) of FIG. 20, leftover bits (if any) may be sequentially (or further alternatively) allocated or otherwise distributed to the larger RU(s) (e.g., RU2).

Figure 21:
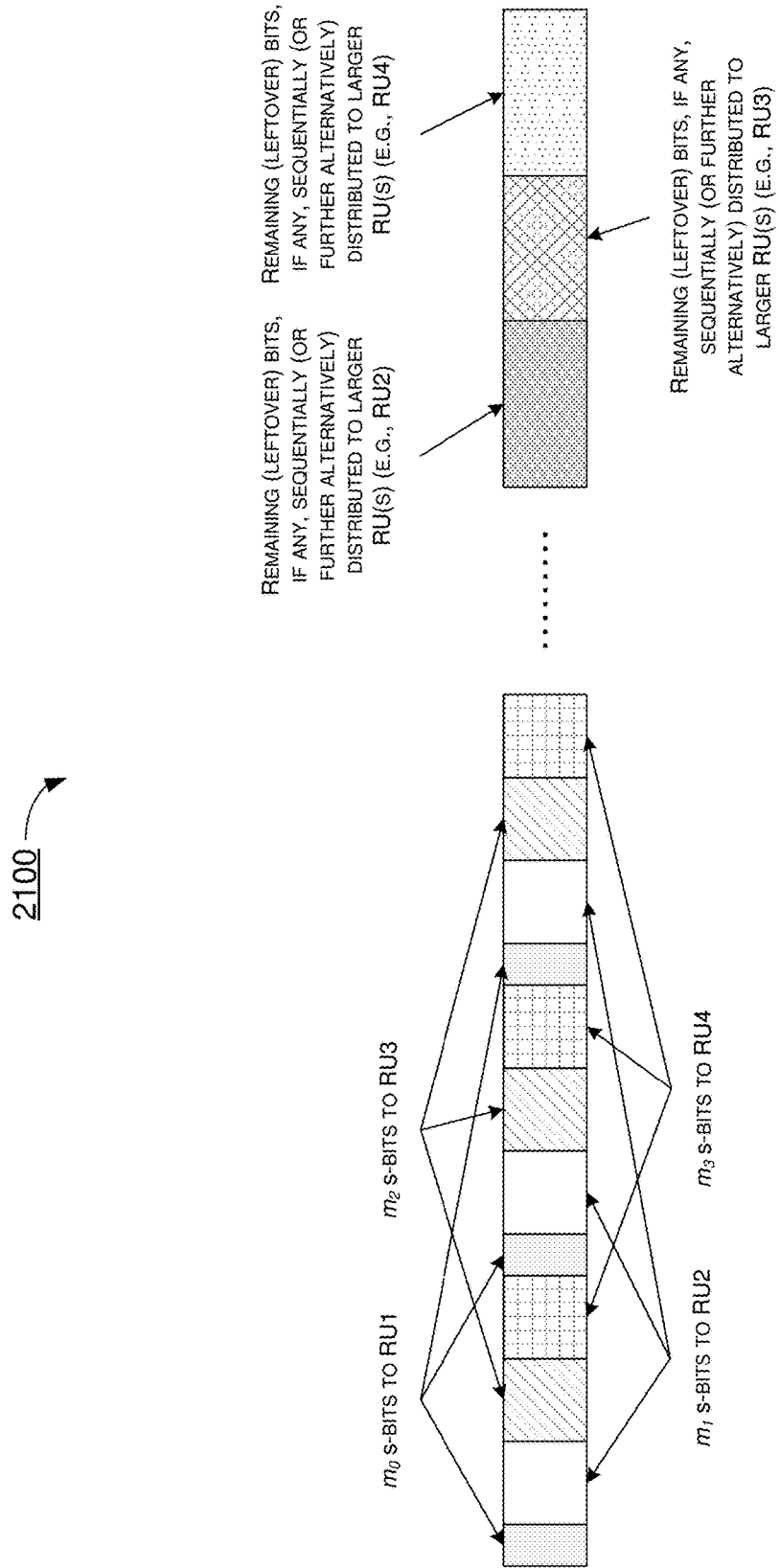
FIG. 21 is a diagram of an example scenario in accordance with the present disclosure.

FIG. 21 illustrates an example scenario 2100 of proportional round-robin parsing in accordance with a proposed scheme of the present disclosure. Scenario 2100 shows an example of proportional round-robin parsing to four RUs, with each RU being in a respective 80-MHz frequency segment. In this example, the round-robin parsing may be performed with a ratio of m0:m1:m2:m3, with m1>m0, m2>m0, m3>m0 and m1=m2=m3 (or, alternatively, 1s:2s:2s:2s, with 2s>1s, 2s>1s, 2s>1s and 2s=2s=2s). Accordingly, leftover bits (if any) may be sequentially (or further alternatively) allocated or otherwise distributed to the larger RU(s) (e.g., RU2, RU3 and RU4).

Figure 22:
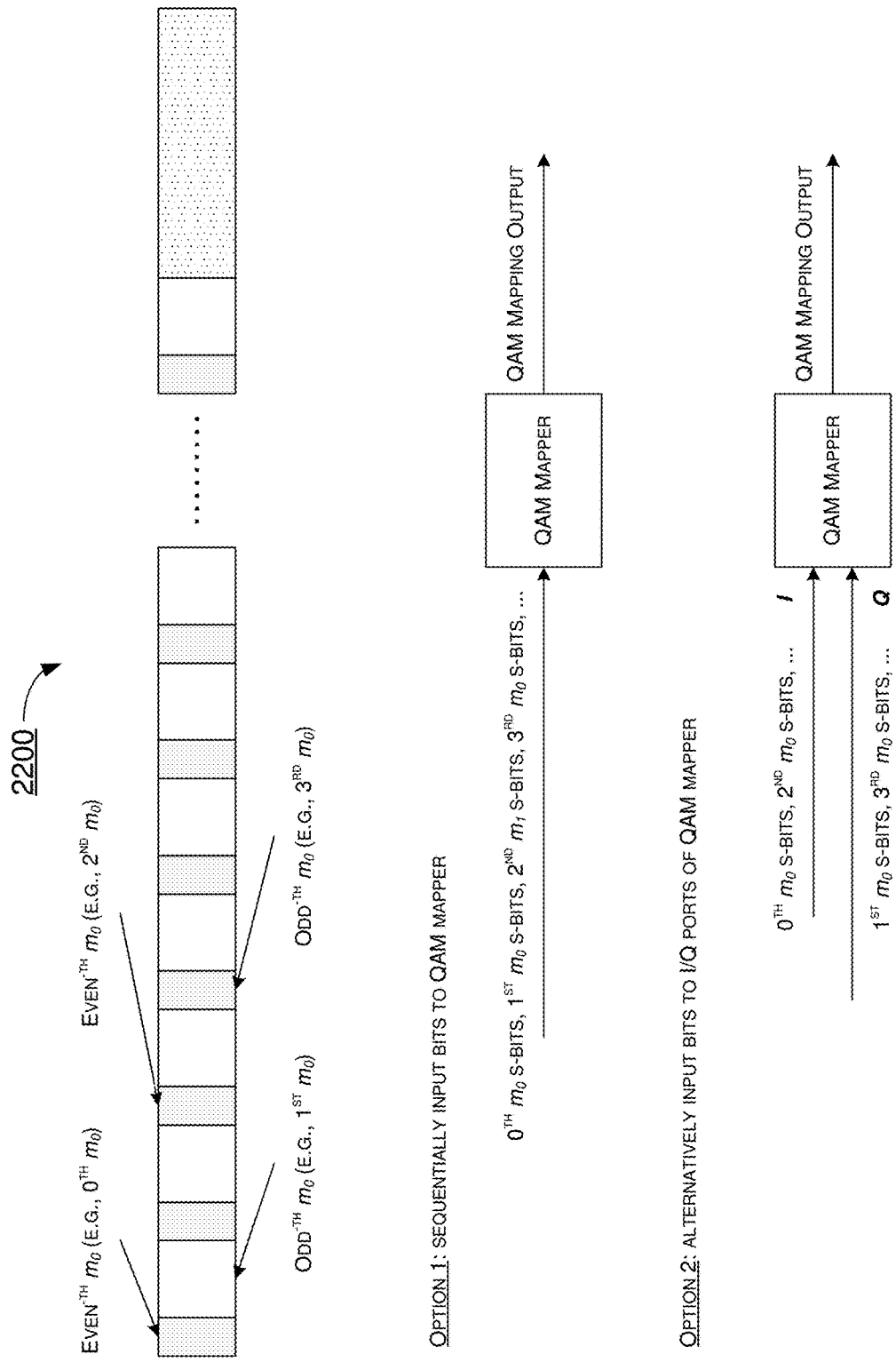
FIG. 22 is a diagram of an example scenario in accordance with the present disclosure.

FIG. 22 illustrates an example scenario 2200 of proportional round-robin parsing in accordance with a proposed scheme of the present disclosure. Scenario 2200 shows two options for providing an output of an RU parser to a QAM mapper. In a first option (option 1), the output of the RU parser may be sequentially input to the QAM mapper. In a second option (option 2), the output of the RU parser may be alternatively input to the real port (I) and the imaginary port (Q) of the QAM mapper.

FIG. 23 illustrates an example scenario 2300 in accordance with the present disclosure. Part (A) of FIG. 23 shows a table of a set of example $m_i$ ratio configurations for proportional round-robin parsing with leftover bits. Part (B) of FIG. 23 shows a table of a set of larger $m_i$ ratio configurations without leftover bits. For instance, for the same RU combination of RU484+996, the m0:m1 (or 1s:2s) ratio is approximated to be 1:2 in the table shown in part (A) of FIG. 23 and the m0:m1 (or 1s:2s) ratio is 117:245 (without approximation) in the table shown in part (B) of FIG. 23. Also, as can be seen, for the same RU combination of RU484+996, the smaller ratio of 1:2 may result in some remaining or leftover bits while the larger ratio of 117:245 may result in no leftover bits. It is believed that a smaller ratio may result in better performance but at the cost of increase complexity in implementation. On the other hand, a larger ratio may enhance simplicity in implementation with performance degradation.

With respect to a proportional round-robin parser in accordance with various proposed schemes of the present disclosure, $x_m$ may denote the bit sequence input to the proportional round-robin parser, and $y_{k,l}$ may denote the output of the proportional round-robin parser. Then, the proportional round-robin parser may be described as follows:

$$y_{k,l} = x_m, s = \max\left(1, \frac{N_{bpscs,i}}{2}\right)$$

$$m = \left(\sum_{l=0}^{L-1} m_l\right) * \left\lfloor \frac{k}{m_i} \right\rfloor + \sum_{i=0}^{i-1} m_i + (k \bmod m_i),$$

k=0, 1, ..., $(N_{cbpss,i} - n_t * 44 * N_{bpscs,i} - 1)$
l is the frequency subblock (or 80 MHz segment) index, l=0, 1, 2, ..., L
$n_l$=1 for subblock l with leftover bits, $n_l$=0 otherwise $x_m$ is bit m of a block $\sum_{l=0}^{L-1} N_{cbpss,l}$ bits and m = 0, 1, ..., $\sum_{l=0}^{L-1} N_{cbpss,l} - 1$ $y_{k,l}$ is bit k of frequency subblock (or RU in 80 MHz segment) l It is noteworthy that the generalized equation above may be utilized for all cases of RU aggregations of various sizes of RUs including, for example and without limitation, 484+2*996, 3*996, 2*996, and so on. For frequency subblock l with leftover bits (e.g., $n_l$=1), the leftover bits may be further processed as follows:

$$m = \left(\sum_{l=0}^{L-1} m_l\right) * \left\lfloor \frac{N_{cbpss,l_0}}{m_{l_0}} \right\rfloor + \left(\sum_{l=0,l\neq l_0}^{L-1} m_l\right) * \left\lfloor \frac{k'}{m_l} \right\rfloor + \sum_{i=0,i\neq l_0}^{l-1} m_i + (k \bmod m_l),$$

Where: $l_0$ is the subblock index with $b_{l_0}$=0 (i.e. the subblock without leftover bits)
k=$(N_{cbpss,l} - n_l * 44 * N_{bpscs,l})$, ..., $N_{cbpss,l}$−1
k'=k−$(N_{cbpss,l} - n_l * 44 * N_{bpscs,l})$ Under a proposed scheme in accordance with the present disclosure, a "quasi-joint" tone mapper may be utilized for multi-RU operations. The performance of joint tone mapper may depend on the parameter $D_{TM}$. For some RU combinations across a 80-MHz frequency segment, the size of $D_{TM}$ may be limited. For example, for RU484+2*996, the aggregate number of data subcarriers ($vN_{sd}$)=468+2*980=2428; factor(2428)=282*607; maximum $D_{TM}$=4. As another example, for RU484+996, $vN_{sd}$=468+980=1448; factor(1448)=[2 2 2 181]; maximum $D_{TM}$=8. As yet another example, for RU(242+484)+996, $vN_{sd}$=234+468+980=1682; factor(1682)=[2 29 29]; maximum $D_{TM}$=29.

To improve performance of the joint tone mapper, a "quasi-joint" tone mapper may be utilized by keeping one or more tones (herein interchangeably referred to as "dropped tones") in "fixed" (or "predefined") locations with the remaining tones passing through a joint-tone mapper. For example, for RU484+996, four tones may be dropped ($N_{drop}$=4) with 1444 tones going through a joint-tone mapper, then factor(1444)=[2 2 19 19], with $D_{TM}$=38. Accordingly, the "quasi-joint" tone mapper may be configured with the pair of parameters ($N_{dtm}$, $N_{drop}$)=(38, 4) or another pair of values. For RU(242+484)+996, two tones may be dropped ($N_{drop}$=2) with 1680 tones going through a joint-tone mapper, then factor(1680)=[2 2 2 3 5 7], with $D_{TM}$=40 (or another value). Alternatively, one tone may be dropped ($N_{drop}$=1) with 1681 tones going through a joint-tone mapper, then factor (1681)=41*41, with $D_{TM}$=41 (or another value).

FIG. 24 illustrates an example scenario 2400 in accordance with the present disclosure. Referring to FIG. 24, a table shows a set of ($D_{TM}$, $N_{drop}$) configurations for different RU combinations. It is noteworthy that the general concept of this RU parser under the proposed scheme may also be applied to other settings of ($D_{TM}$, $N_{drop}$). As for interpretation of the table for the pair of values of ($D_{TM}$, $N_{drop}$), for example, for the entry of RU combination RU484+996, ($D_{TM}$, $N_{drop}$) may be interpreted as (38, 4) or (32, 8) or (36, 8). It is also noteworthy that the joint tone mapper under the proposed scheme may also operate with other pairs of values of ($D_{TM}$, $N_{drop}$).

Figure 25:
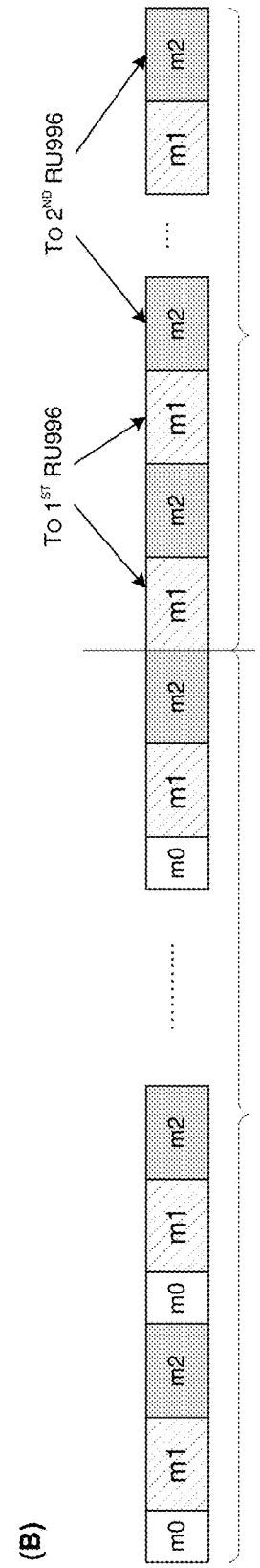
FIG. 25 is a diagram of an example scenario in accordance with the present disclosure.

FIG. 25 illustrates an example scenario 2500 in accordance with the present disclosure. Part (A) of FIG. 25 shows a table of proportional round-robin segment parser parameters. Under a proposed scheme in accordance with the present disclosure, FIG. 25 shows some example multi-RUs as well as the following parameters associated with each multi-RU:RU orders, total number of tones ($N_{sd\_total}$), proportional ratios, and leftover bits. The segment parser bit distribution processing may start from the lowest frequency RU to the highest frequency RU. Some of the parameters in the table may be defined as follows:

$$s = \max\left(1, \frac{N_{bpscs,u}}{2}\right)$$

$N_{lft} = 44$ for $DCM = 0$, $N_{lft} = 22$ for $DCM = 1$

In terms of number of leftover bits ($N_{lft}$), $N_{lft}$=44 for DCM=0 (e.g., dual carrier modulation (DCM) is not enabled) and $N_{lft}$=22 for DCM=1 (e.g., DCM is enabled). Moreover:

$$y_{k,l,u} = x_{m,u}$$

$$m = \left(\sum_{l=0}^{L-1}(m)_l\right) * \left\lfloor\frac{k}{m_l}\right\rfloor + \sum_{i=0}^{l-1} m_i + (k \bmod m_l)$$

Parameters in the above expressions are defined as follows:

$k = 0, 1, \ldots, (N_{cbpss,l,u} - n_l * N_{lft} * N_{bpscs,l,u} - 1)$ $x_{m,u}$ is bit $m$ of a block $\sum_{l=0}^{L-1} N_{cbpss,l,u}$ bits and $m = 0$, $1, \ldots, \sum_{l=0}^{L-1} N_{cbpss,l,u} - 1$ $m_l$ is the proportional ratio defined in Table 34-t1
l is the frequency subblock index, l=0, 1, 2, . . . , L−1
L is the number of frequency subblocks.

$$L = \begin{cases} 2 \text{ for } 484 + 996, (242 + 484) + 996, 2 \times 996 \text{ tone } RU/MRU \\ 3 \text{ for } 484 + 2 \times 996, 3 \times 996 \text{ tone } MRU \\ 4 \text{ for } 484 + 3 \times 996, 4 \times 996 \text{ tone } RU/MRU \end{cases}$$

$y_{k,l,u}$ is bit k frequency subblock l
$n_l$ $n_l$=1 for subblock l with nonzero leftover bits, $n_l$=0 otherwise
u=0, 1, . . . , $N_{user}$−1

NOTE: $\sum_{i=0}^{l-1} m_i = 0$ for subblock $l = 0$

Under the proposed scheme, for multi-RUs with the number of leftover bits in the table of FIG. 25 not being zero, the proportional round-robin parser may continue processing the leftover bits as follows:

$$m = \left(\sum_{l=0}^{L-1} m_l\right) * \left\lfloor\frac{N_{cbpss,l_0,u}}{m_{l_0}}\right\rfloor + \left(\sum_{l=0,l\neq l_0}^{L-1} m_l\right) * \left\lfloor\frac{k'}{m_l}\right\rfloor + \sum_{i=0,i\neq l_0}^{l-1} m_i + (k \bmod m_l)$$

Parameters in the above expression are defined as follows:
k=($N_{cbpss,l,u}$−$n_l$*$N_{lft}$*$N_{bpscs,l,u}$), . . . , $N_{cbpss,l,u}$−1
k'=k−($N_{cbpss,l,u}$−$n_l$*$N_{lft}$*$N_{bpscs,l,u}$)
$l_0$ is the subblock index with $n_{l_0}$=0 (i.e. the subblock without leftover bits)

Part (B) of FIG. 25 shows an example of processing of leftover bits by a proportional round-robin parser with leftover bits in accordance with the proposed scheme.

Illustrative Implementations

Figure 26:
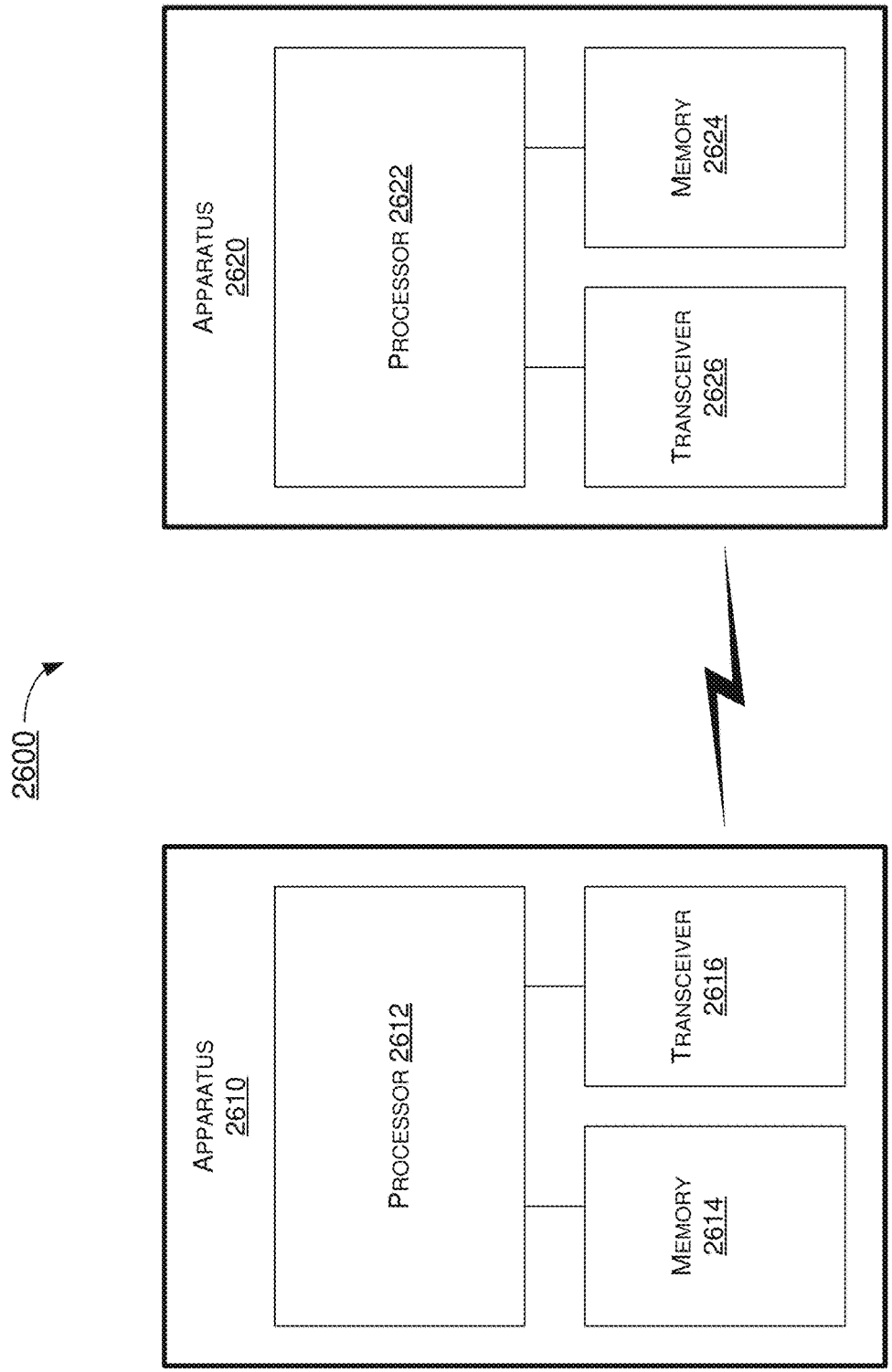
FIG. 26 is a block diagram of an example communication system in accordance with an implementation of the present disclosure.

FIG. 26 illustrates an example system 2600 having at least an example apparatus 2610 and an example apparatus 2620 in accordance with an implementation of the present disclosure. Each of apparatus 2610 and apparatus 2620 may perform various functions to implement schemes, techniques, processes and methods described herein pertaining to optimization of RU and segment parser design for aggregated and multi-RU operations in EHT systems, including the various schemes described above with respect to various proposed designs, concepts, schemes, systems and methods described above as well as processes described below. For instance, apparatus 2610 may be implemented in STA 110 and apparatus 2620 may be implemented in STA 120, or vice versa.

Each of apparatus 2610 and apparatus 2620 may be a part of an electronic apparatus, which may be a STA or an AP, such as a portable or mobile apparatus, a wearable apparatus, a wireless communication apparatus or a computing apparatus. When implemented in a STA, each of apparatus 2610 and apparatus 2620 may be implemented in a smartphone, a smart watch, a personal digital assistant, a digital camera, or a computing equipment such as a tablet computer, a laptop computer or a notebook computer. Each of apparatus 2610 and apparatus 2620 may also be a part of a machine type apparatus, which may be an IoT apparatus such as an immobile or a stationary apparatus, a home apparatus, a wire communication apparatus or a computing apparatus. For instance, each of apparatus 2610 and apparatus 2620 may be implemented in a smart thermostat, a smart fridge, a smart door lock, a wireless speaker or a home control center. When implemented in or as a network apparatus, apparatus 2610 and/or apparatus 2620 may be implemented in a network node, such as an AP in a WLAN.

In some implementations, each of apparatus 2610 and apparatus 2620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2610 and apparatus 2620 may be implemented in or as a STA or an AP. Each of apparatus 2610 and apparatus 2620 may include at least some of those components shown in FIG. 26 such as a processor 2612 and a processor 2622, respectively, for example. Each of apparatus 2610 and apparatus 2620 may further include one or more other components not pertinent to the proposed scheme of the present disclosure (e.g., internal power supply, display device and/or user interface device), and, thus, such component(s) of apparatus 2610 and apparatus 2620 are neither shown in FIG. 26 nor described below in the interest of simplicity and brevity.

In one aspect, each of processor 2612 and processor 2622 may be implemented in the form of one or more single-core processors, one or more multi-core processors, one or more RISC processors or one or more CISC processors. That is, even though a singular term "a processor" is used herein to refer to processor 2612 and processor 2622, each of processor 2612 and processor 2622 may include multiple processors in some implementations and a single processor in other implementations in accordance with the present disclosure. In another aspect, each of processor 2612 and processor 2622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2612 and processor 2622 is a special-purpose machine specifically designed, arranged and configured to perform specific tasks including those pertaining to optimization of RU and segment parser design for aggregated and multi-RU operations in EHT systems in accordance with various implementations of the present disclosure.

In some implementations, apparatus 2610 may also include a transceiver 2616 coupled to processor 2612. Transceiver 2616 may include a transmitter capable of wirelessly transmitting and a receiver capable of wirelessly receiving data. In some implementations, apparatus 2620 may also include a transceiver 2626 coupled to processor 2622. Transceiver 2626 may include a transmitter capable of wirelessly transmitting and a receiver capable of wirelessly receiving data. It is noteworthy that, although transceiver 2616 and transceiver 2626 are illustrated as being external to and separate from processor 2612 and processor 2622, respectively, in some implementations, transceiver 2616 may be an integral part of processor 2612 as a system on chip (SoC) and/or transceiver 2626 may be an integral part of processor 2622 as a SoC.

In some implementations, apparatus 2610 may further include a memory 2614 coupled to processor 2612 and capable of being accessed by processor 2612 and storing data therein. In some implementations, apparatus 2620 may further include a memory 2624 coupled to processor 2622 and capable of being accessed by processor 2622 and storing data therein. Each of memory 2614 and memory 2624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2614 and memory 2624 may include a type of read-only memory (ROM) such as mask ROM, programmable ROM (PROM), erasable programmable ROM (EPROM) and/or electrically erasable programmable ROM (EEPROM). Alternatively, or additionally, each of memory 2614 and memory 2624 may include a type of non-volatile random-access memory (NVRAM) such as flash memory, solid-state memory, ferroelectric RAM (FeRAM), magnetoresistive RAM (MRAM) and/or phase-change memory.

Each of apparatus 2610 and apparatus 2620 may be a communication entity capable of communicating with each other using various proposed schemes in accordance with the present disclosure. For illustrative purposes and without limitation, a description of capabilities of apparatus 2610, as STA 110, and apparatus 2620, as STA 120, is provided below. It is noteworthy that, although a detailed description of capabilities, functionalities and/or technical features of apparatus 2610 is provided below, the same may be applied to apparatus 2620 although a detailed description thereof is not provided solely in the interest of brevity. It is also noteworthy that, although the example implementations described below are provided in the context of WLAN, the same may be implemented in other types of networks.

Under a proposed scheme pertaining to optimization of RU and segment parser design for aggregated and multi-RU operations in EHT systems in accordance with the present disclosure, with apparatus 2610 implemented in or as STA 110 and apparatus 2620 implemented in or as STA 120 in network environment 100, processor 2612 of apparatus 2610 may code data for a STA (e.g., STA 120) to provide a stream of coded bits. Additionally, processor 2612 may process the stream of coded bits to provide processed bits, including parsing the stream of coded bits to a combination of multiple RUs in a proportional round-robin fashion assigned to the STA. Moreover, processor 2612 may wirelessly transmit, via transceiver 2616, the processed bits to the STA over the combination of multiple RUs.

In some implementations, in parsing the stream of coded bits to the combination of multiple RUs in the proportional round-robin fashion processor 2612 may perform certain operations. For instance, processor 2612 may approximate a proportional ratio of a plurality of integers with each of the integers representative of a respective size of a corresponding RU of the combination of multiple RUs. Additionally, processor 2612 may alternatively allocate a respective number of the coded bits to each RU of the combination of multiple RUs in a round-robin fashion, with the respective number being proportional to the respective size of the corresponding RU in the proportional ratio.

In some implementations, the respective number of the coded bits (e.g., s-bits as described above) alternatively allocated to each RU in the round-robin fashion may be either 1 or a value equal to one half of a number of coded bits per single carrier for each spatial stream, whichever is larger.

In some implementations, in an event that there are leftover bits after the alternatively allocating in the round-robin fashion, in parsing the stream of coded bits to the combination of multiple RUs in the proportional round-robin fashion, processor 2612 may allocate the leftover bits to one or more RUs of the combination of multiple RUs the respective size of which being larger than that of at least one other RU of the combination of multiple RUs. In some implementations, in allocating the leftover bits to the one or more RUs of the combination of multiple RUs, processor 2612 may sequentially allocate a respective portion of the leftover bits to each of the one or more RUs of the combination of multiple RUs. Alternatively, in allocating the leftover bits to the one or more RUs of the combination of multiple RUs, processor 2612 may further alternatively allocate a respective portion of the leftover bits to each of the one or more RUs of the combination of multiple RUs. In some implementations, the one or more RUs may include at least two RUs of the combination of multiple RUs. In such cases, in further alternatively allocating the respective portion of the leftover bits to each of the one or more RUs of the combination of multiple RUs, processor 2612 may further alternatively allocate an equal portion of the leftover bits to each of the one or more RUs of the combination of multiple RUs.

In some implementations, in processing the stream of coded bits, processor 2612 may perform additional operations. For instance, processor 2612 may drop a predetermined number of tones of a plurality of tones of the combination of multiple RUs. Moreover, processor 2612 may process remaining tones of the plurality of tones of the combination of multiple RUs through a joint-tone mapper. In some implementations, the predetermined number of tones dropped may correspond to a predetermine distance of separation between tones of the plurality of tones.

In some implementations, the combination of multiple RUs may include one RU of 484 tones and one RU of 996 tones. In such cases, the proportional ratio may be 1:2, in unit of s-bits (or alternatively, 1s:2s)

In some implementations, the combination of multiple RUs may include one RU of 484 tones and two RUs of 996 tones. In such cases, the proportional ratio may be 1:2:2 in unit of s-bits (or alternatively, 1s:2s:2s).

In some implementations, the combination of multiple RUs may include one RU of 484 tones and three RUs of 996 tones. In such cases, the proportional ratio may be 1:2:2:2 in unit of s-bits (or alternatively, 1s:2s:2s:2s).

In some implementations, the combination of multiple RUs may include two RUs of 996 tones. In such cases, the proportional ratio may be 1:1 in unit of s-bits (or alternatively, 1s:1s).

In some implementations, the combination of multiple RUs may include three RUs of 996 tones. In such cases, the proportional ratio may be 1:1:1 in unit of s-bits (or alternatively, 1s:1s:1s).

In some implementations, the combination of multiple RUs may include four RUs of 996 tones. In such cases, the proportional ratio may be 1:1:1:1 in unit of s-bits (or alternatively, 1s:1s:1s:1s).

In some implementations, the combination of multiple RUs may include one aggregated RU and one RU of 996 tones with the aggregated RU having one RU of 242 tones and one RU of 484 tones. In such cases, the proportional ratio is 3:4 in unit of s-bits (or alternatively, 3s:4s).

In some implementations, the combination of multiple RUs may include one RU of 484 tones and an aggregated RU having one RU of 242 tones and one RU of 484 tones. In such cases, the proportional ratio may be 2:3 in unit of s-bits (or alternatively, 2s:3s).

Alternatively, the combination of multiple RUs may include a first aggregated RU and a second aggregated RU, with the first aggregated RU having one RU of 242 tones and one RU of 484 tones, and with the second aggregated RU having one RU of 242 tones and one RU of 484 tones. In such cases, the proportional ratio may be 1:1 in unit of s-bits (or alternatively, 1s:1s).

Under a proposed scheme pertaining to optimization of RU and segment parser design for aggregated and multi-RU operations in EHT systems in accordance with the present disclosure, with apparatus 2610 implemented in or as STA 110 and apparatus 2620 implemented in or as STA 120 in network environment 100, processor 2612 of apparatus 2610 may approximate a proportional ratio of a plurality of integers with each of the integers representative of a respective size of a corresponding RU of a combination of multiple RUs. Additionally, processor 2612 may alternatively allocate a respective number of coded bits of a stream of coded bits to each RU of the combination of multiple RUs in a round-robin fashion, with the respective number being proportional to the respective size of the corresponding RU in the proportional ratio to provide processed bits. Moreover, processor 2612 may wirelessly transmit, via transceiver 2616, the processed bits over the combination of multiple RUs to a STA (e.g., STA 120).

In some implementations, the respective number of the coded bits alternatively allocated to each RU in the round-robin fashion may be either 1 or a value equal to one half of a number of coded bits per single carrier for each spatial stream, whichever is larger.

In some implementations, in an event that there are leftover bits after the alternatively allocating in the round-robin fashion, in parsing the stream of coded bits to the combination of multiple RUs in the proportional round-robin fashion, processor 2612 may allocate the leftover bits to one or more RUs of the combination of multiple RUs the respective size of which being larger than that of at least one other RU of the combination of multiple RUs. In some implementations, in allocating the leftover bits to the one or more RUs of the combination of multiple RUs, processor 2612 may sequentially allocate a respective portion of the leftover bits to each of the one or more RUs of the combination of multiple RUs. Alternatively, in allocating the leftover bits to the one or more RUs of the combination of multiple RUs, processor 2612 may further alternatively allocate a respective portion of the leftover bits to each of the one or more RUs of the combination of multiple RUs. Moreover, in an event that the one or more RUs comprise at least two RUs of the combination of multiple RUs, in further alternatively allocating the respective portion of the leftover bits to each of the one or more RUs of the combination of multiple RUs, processor 2612 may further alternatively allocate an equal portion of the leftover bits to each of the one or more RUs of the combination of multiple RUs.

In some implementations, processor 2612 may perform additional operations. For instance, processor 2612 may drop a predetermined number of tones of a plurality of tones of the combination of multiple RUs. Furthermore, processor 2612 may process remaining tones of the plurality of tones of the combination of multiple RUs through a joint-tone mapper. In some implementations, the predetermined number of tones dropped may correspond to a predetermine distance of separation between tones of the plurality of tones.

In some implementations, the combination of multiple RUs may include one RU of 484 tones and one RU of 996 tones. In such cases, the proportional ratio may be 1:2 in unit of s-bits (or alternatively, 1s:2s).

In some implementations, the combination of multiple RUs may include one RU of 484 tones and two RUs of 996 tones. In such cases, the proportional ratio may be 1:2:2 in unit of s-bits (or alternatively, 1s:2s:2s).

In some implementations, the combination of multiple RUs may include one RU of 484 tones and three RUs of 996 tones. In such cases, the proportional ratio may be 1:2:2:2 in unit of s-bits (or alternatively, 1s:2s:2s:2s).

In some implementations, the combination of multiple RUs may include two RUs of 996 tones. In such cases, the proportional ratio may be 1:1 in unit of s-bits (or alternatively, 1s:1s).

In some implementations, the combination of multiple RUs may include three RUs of 996 tones. In such cases, the proportional ratio may be 1:1:1 in unit of s-bits (or alternatively, 1s:1s:1s).

In some implementations, the combination of multiple RUs may include four RUs of 996 tones. In such cases, the proportional ratio may be 1:1:1:1 in unit of s-bits (or alternatively, 1s:1s:1s:1s).

In some implementations, the combination of multiple RUs may include one aggregated RU and one RU of 996 tones with the aggregated RU having one RU of 242 tones and one RU of 484 tones. In such cases, the proportional ratio is 3:4 in unit of s-bits (or alternatively, 3s:4s).

In some implementations, the combination of multiple RUs may include one RU of 484 tones and an aggregated RU having one RU of 242 tones and one RU of 484 tones. In such cases, the proportional ratio may be 2:3 in unit of s-bits (or alternatively, 2s:3s).

Alternatively, the combination of multiple RUs may include a first aggregated RU and a second aggregated RU, with the first aggregated RU having one RU of 242 tones and one RU of 484 tones, and with the second aggregated RU having one RU of 242 tones and one RU of 484 tones. In such cases, the proportional ratio may be 1:1 in unit of s-bits (or alternatively, 1s:1s).

Illustrative Processes

Figure 27:
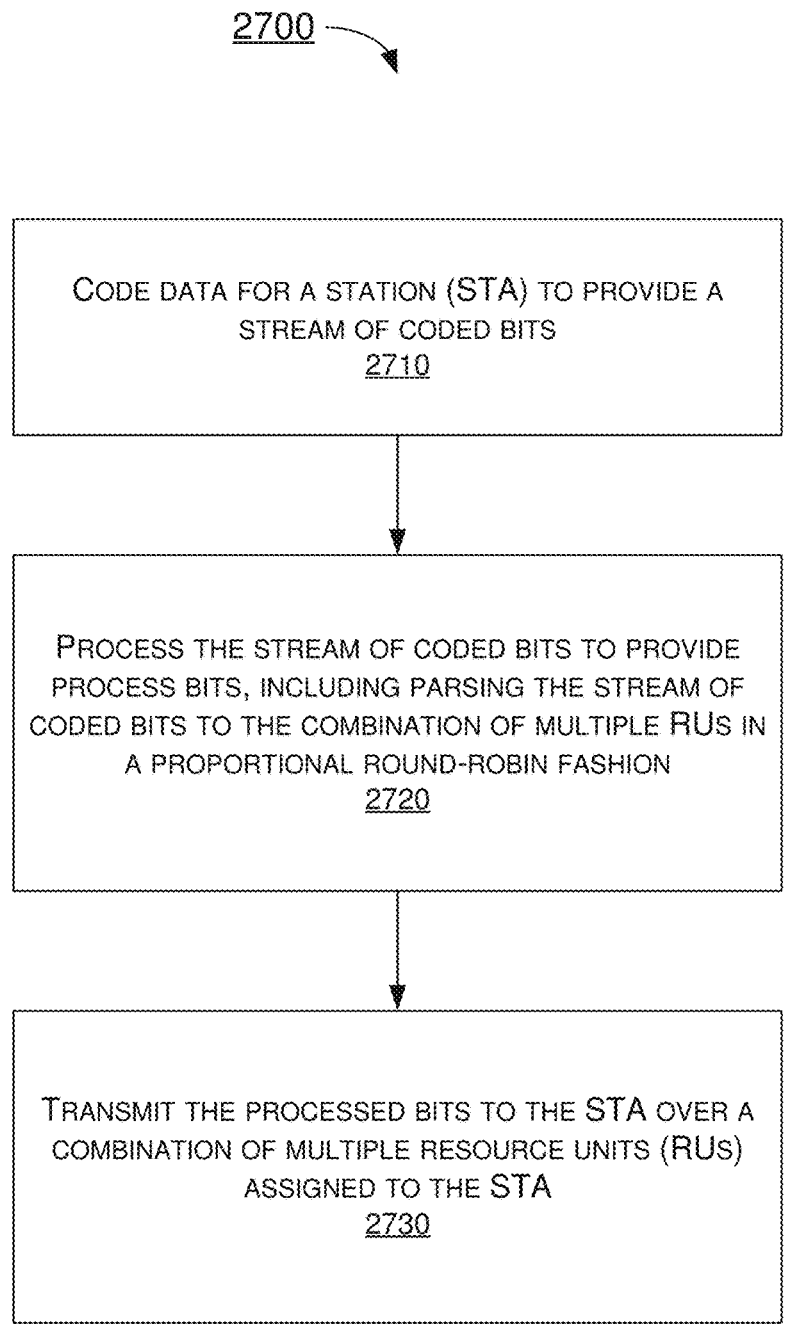
FIG. 27 is a flowchart of an example process in accordance with an implementation of the present disclosure.

FIG. 27 illustrates an example process 2700 in accordance with an implementation of the present disclosure. Process 2700 may represent an aspect of implementing various proposed designs, concepts, schemes, systems and methods described above. More specifically, process 2700 may represent an aspect of the proposed concepts and schemes pertaining to optimization of RU and segment parser design for aggregated and multi-RU operations in EHT systems in accordance with the present disclosure. Process 2700 may include one or more operations, actions, or functions as illustrated by one or more of blocks 2710, 2720 and 2730. Although illustrated as discrete blocks, various blocks of process 2700 may be divided into additional blocks, combined into fewer blocks, or eliminated, depending on the desired implementation. Moreover, the blocks/sub-blocks of process 2700 may be executed in the order shown in FIG. 27 or, alternatively in a different order. Furthermore, one or more of the blocks/sub-blocks of process 2700 may be executed repeatedly or iteratively. Process 2700 may be implemented by or in apparatus 2610 and apparatus 2620 as well as any variations thereof. Solely for illustrative purposes and without limiting the scope, process 2700 is described below in the context of apparatus 2610 implemented in or as STA 110 and apparatus 2620 implemented in or as STA 120 of a wireless network such as a WLAN in network environment 100 in accordance with one or more of IEEE 802.11 standards. Process 2700 may begin at block 2710.

At 2710, process 2700 may involve processor 2612 of apparatus 2610 (e.g., STA 110) coding data for a STA (e.g., STA 120) to provide a stream of coded bits. Process 2700 may proceed from 2710 to 2720.

At 2720, process 2700 may involve processor 2612 processing the stream of coded bits to provide processed bits, including parsing the stream of coded bits to a combination of multiple RUs in a proportional round-robin fashion assigned to the STA. Process 2700 may proceed from 2720 to 2730.

At 2730, process 2700 may involve processor 2612 transmitting, via transceiver 2616, the processed bits to the STA over the combination of multiple RUs.

In some implementations, in parsing the stream of coded bits to the combination of multiple RUs in the proportional round-robin fashion, process 2700 may involve processor 2612 performing certain operations. For instance, process 2700 may involve processor 2612 approximating a proportional ratio of a plurality of integers with each of the integers representative of a respective size of a corresponding RU of the combination of multiple RUs. Additionally, process 2700 may involve processor 2612 alternatively allocating a respective number of the coded bits to each RU of the combination of multiple RUs in a round-robin fashion, with the respective number being proportional to the respective size of the corresponding RU in the proportional ratio.

In some implementations, the respective number of the coded bits (e.g., s-bits as described above) alternatively allocated to each RU in the round-robin fashion may be either 1 or a value equal to one half of a number of coded bits per single carrier for each spatial stream, whichever is larger.

In some implementations, in an event that there are leftover bits after the alternatively allocating in the round-robin fashion, in parsing the stream of coded bits to the combination of multiple RUs in the proportional round-robin fashion, process 2700 may also involve processor 2612 allocating the leftover bits to one or more RUs of the combination of multiple RUs the respective size of which being larger than that of at least one other RU of the combination of multiple RUs. In some implementations, in allocating the leftover bits to the one or more RUs of the combination of multiple RUs, process 2700 may involve processor 2612 sequentially allocating a respective portion of the leftover bits to each of the one or more RUs of the combination of multiple RUs. Alternatively, in allocating the leftover bits to the one or more RUs of the combination of multiple RUs, process 2700 may involve processor 2612 further alternatively allocating a respective portion of the leftover bits to each of the one or more RUs of the combination of multiple RUs. In some implementations, the one or more RUs may include at least two RUs of the combination of multiple RUs. In such cases, in further alternatively allocating the respective portion of the leftover bits to each of the one or more RUs of the combination of multiple RUs, process 2700 may involve processor 2612 further alternatively allocating an equal portion of the leftover bits to each of the one or more RUs of the combination of multiple RUs.

In some implementations, in processing the stream of coded bits, process 2700 may involve processor 2612 performing additional operations. For instance, process 2700 may involve processor 2612 dropping a predetermined number of tones of a plurality of tones of the combination of multiple RUs. Moreover, process 2700 may involve processor 2612 processing remaining tones of the plurality of tones of the combination of multiple RUs through a joint-tone mapper. In some implementations, the predetermined number of tones dropped may correspond to a predetermine distance of separation between tones of the plurality of tones.

In some implementations, the combination of multiple RUs may include one RU of 484 tones and one RU of 996 tones. In such cases, the proportional ratio may be 1:2 in unit of s-bits (or alternatively, 1s:2s).

In some implementations, the combination of multiple RUs may include one RU of 484 tones and two RUs of 996 tones. In such cases, the proportional ratio may be 1:2:2 in unit of s-bits (or alternatively, 1s:2s:2s).

In some implementations, the combination of multiple RUs may include one RU of 484 tones and three RUs of 996 tones. In such cases, the proportional ratio may be 1:2:2:2 in unit of s-bits (or alternatively, 1s:2s:2s:2s).

In some implementations, the combination of multiple RUs may include two RUs of 996 tones. In such cases, the proportional ratio may be 1:1 in unit of s-bits (or alternatively, 1s:1s).

In some implementations, the combination of multiple RUs may include three RUs of 996 tones. In such cases, the proportional ratio may be 1:1:1 in unit of s-bits (or alternatively, 1s:1s:1s).

In some implementations, the combination of multiple RUs may include four RUs of 996 tones. In such cases, the proportional ratio may be 1:1:1:1 in unit of s-bits (or alternatively, 1s:1s:1s:1s).

In some implementations, the combination of multiple RUs may include one aggregated RU and one RU of 996 tones with the aggregated RU having one RU of 242 tones and one RU of 484 tones. In such cases, the proportional ratio is 3:4 in unit of s-bits (or alternatively, 3s:4s).

In some implementations, the combination of multiple RUs may include one RU of 484 tones and an aggregated RU having one RU of 242 tones and one RU of 484 tones.

In such cases, the proportional ratio may be 2:3 in unit of s-bits (or alternatively, 2s:3s).

Alternatively, the combination of multiple RUs may include a first aggregated RU and a second aggregated RU, with the first aggregated RU having one RU of 242 tones and one RU of 484 tones, and with the second aggregated RU having one RU of 242 tones and one RU of 484 tones. In such cases, the proportional ratio may be 1:1 in unit of s-bits (or alternatively, 1s:1s).

Figure 28:
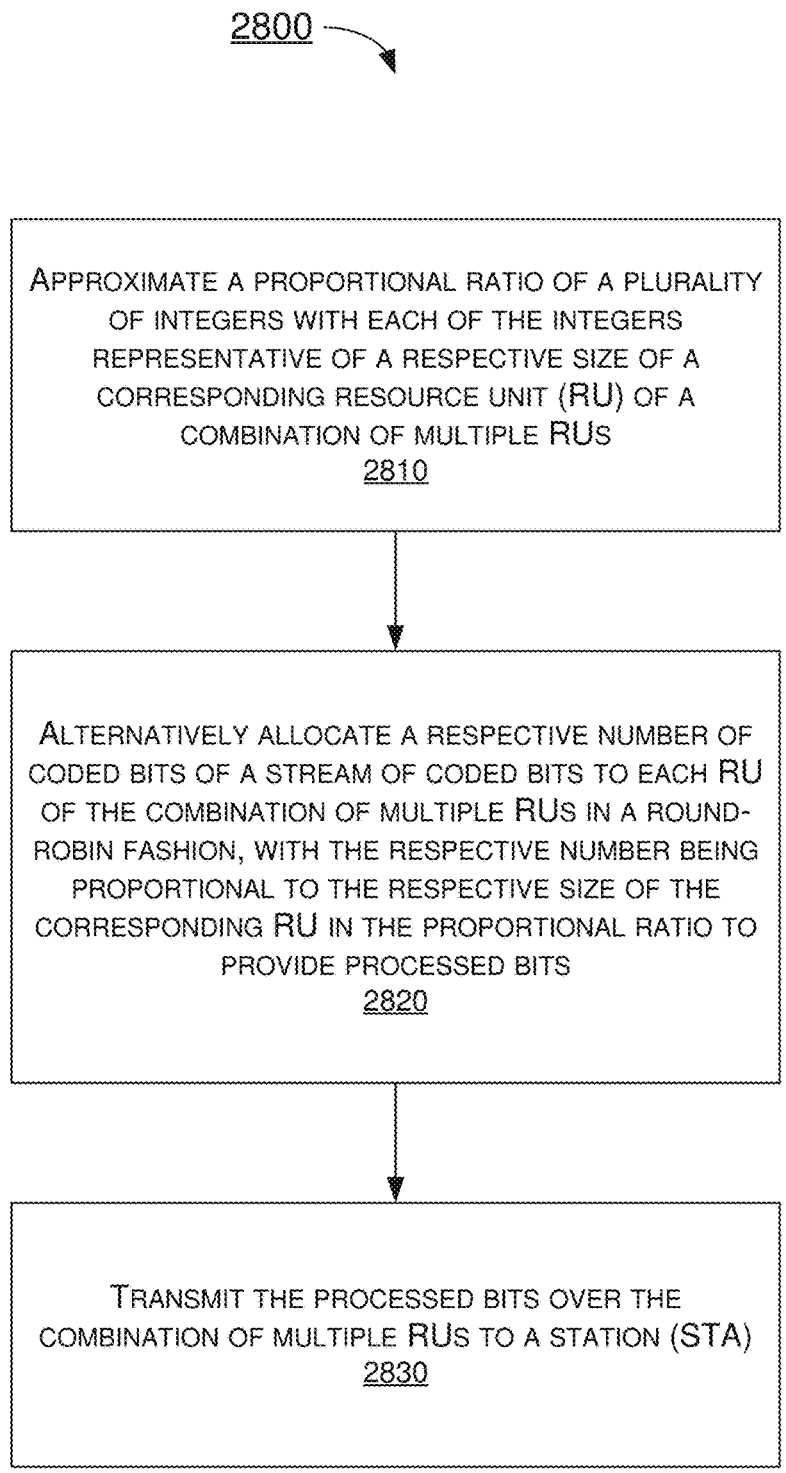
FIG. 28 is a flowchart of an example process in accordance with an implementation of the present disclosure.

FIG. 28 illustrates an example process 2800 in accordance with an implementation of the present disclosure. Process 2800 may represent an aspect of implementing various proposed designs, concepts, schemes, systems and methods described above. More specifically, process 2800 may represent an aspect of the proposed concepts and schemes pertaining to optimization of RU and segment parser design for aggregated and multi-RU operations in EHT systems in accordance with the present disclosure. Process 2800 may include one or more operations, actions, or functions as illustrated by one or more of blocks 2810, 2820 and 2830. Although illustrated as discrete blocks, various blocks of process 2800 may be divided into additional blocks, combined into fewer blocks, or eliminated, depending on the desired implementation. Moreover, the blocks/sub-blocks of process 2800 may be executed in the order shown in FIG. 28 or, alternatively in a different order. Furthermore, one or more of the blocks/sub-blocks of process 2800 may be executed repeatedly or iteratively. Process 2800 may be implemented by or in apparatus 2610 and apparatus 2620 as well as any variations thereof. Solely for illustrative purposes and without limiting the scope, process 2800 is described below in the context of apparatus 2610 implemented in or as STA 110 and apparatus 2620 implemented in or as STA 120 of a wireless network such as a WLAN in network environment 100 in accordance with one or more of IEEE 802.11 standards. Process 2800 may begin at block 2810.

At 2810, process 2800 may involve processor 2612 of apparatus 2610 (e.g., STA 110) approximating a proportional ratio of a plurality of integers with each of the integers representative of a respective size of a corresponding RU of a combination of multiple RUs. Process 2800 may proceed from 2810 to 2820.

At 2820, process 2800 may involve processor 2612 alternatively allocating a respective number of coded bits of a stream of coded bits to each RU of the combination of multiple RUs in a round-robin fashion, with the respective number being proportional to the respective size of the corresponding RU in the proportional ratio to provide processed bits. Process 2800 may proceed from 2820 to 2830.

At 2830, process 2800 may involve processor 2612 transmitting, via transceiver 2616, the processed bits over the combination of multiple RUs to a STA (e.g., STA 120).

In some implementations, the respective number of the coded bits alternatively allocated to each RU in the round-robin fashion may be either 1 or a value equal to one half of a number of coded bits per single carrier for each spatial stream, whichever is larger.

In some implementations, in an event that there are leftover bits after the alternatively allocating in the round-robin fashion, in parsing the stream of coded bits to the combination of multiple RUs in the proportional round-robin fashion, process 2800 may also involve processor 2612 allocating the leftover bits to one or more RUs of the combination of multiple RUs the respective size of which being larger than that of at least one other RU of the combination of multiple RUs. In some implementations, in allocating the leftover bits to the one or more RUs of the combination of multiple RUs, process 2800 may involve processor 2612 sequentially allocating a respective portion of the leftover bits to each of the one or more RUs of the combination of multiple RUs. Alternatively, in allocating the leftover bits to the one or more RUs of the combination of multiple RUs, process 2800 may involve processor 2612 further alternatively allocating a respective portion of the leftover bits to each of the one or more RUs of the combination of multiple RUs. Moreover, in an event that the one or more RUs comprise at least two RUs of the combination of multiple RUs, in further alternatively allocating the respective portion of the leftover bits to each of the one or more RUs of the combination of multiple RUs, process 2800 may involve processor 2612 further alternatively allocating an equal portion of the leftover bits to each of the one or more RUs of the combination of multiple RUs.

In some implementations, process 2800 may involve processor 2612 performing additional operations. For instance, process 2800 may involve processor 2612 dropping a predetermined number of tones of a plurality of tones of the combination of multiple RUs. Furthermore, process 2800 may involve processor 2612 processing remaining tones of the plurality of tones of the combination of multiple RUs through a joint-tone mapper. In some implementations, the predetermined number of tones dropped may correspond to a predetermine distance of separation between tones of the plurality of tones.

In some implementations, the combination of multiple RUs may include one RU of 484 tones and one RU of 996 tones. In such cases, the proportional ratio may be 1:2 in unit of s-bits (or alternatively, 1s:2s).

In some implementations, the combination of multiple RUs may include one RU of 484 tones and two RUs of 996 tones. In such cases, the proportional ratio may be 1:2:2 in unit of s-bits (or alternatively, 1s:2s:2s).

In some implementations, the combination of multiple RUs may include one RU of 484 tones and three RUs of 996 tones. In such cases, the proportional ratio may be 1:2:2:2 in unit of s-bits (or alternatively, 1s:2s:2s:2s).

In some implementations, the combination of multiple RUs may include two RUs of 996 tones. In such cases, the proportional ratio may be 1:1 in unit of s-bits (or alternatively, 1s:1s).

In some implementations, the combination of multiple RUs may include three RUs of 996 tones. In such cases, the proportional ratio may be 1:1:1 in unit of s-bits (or alternatively, 1s:1s:1s).

In some implementations, the combination of multiple RUs may include four RUs of 996 tones. In such cases, the proportional ratio may be 1:1:1:1 in unit of s-bits (or alternatively, 1s:1s:1s:1s).

In some implementations, the combination of multiple RUs may include one aggregated RU and one RU of 996 tones with the aggregated RU having one RU of 242 tones and one RU of 484 tones. In such cases, the proportional ratio is 3:4 in unit of s-bits (or alternatively, 3s:4s).

In some implementations, the combination of multiple RUs may include one RU of 484 tones and an aggregated RU having one RU of 242 tones and one RU of 484 tones. In such cases, the proportional ratio may be 2:3 in unit of s-bits (or alternatively, 2s:3s).

Alternatively, the combination of multiple RUs may include a first aggregated RU and a second aggregated RU, with the first aggregated RU having one RU of 242 tones and one RU of 484 tones, and with the second aggregated RU having one RU of 242 tones and one RU of 484 tones. In such cases, the proportional ratio may be 1:1 in unit of s-bits (or alternatively, 1s:1s).

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   coding data for a station (STA) to provide a stream of coded bits;
   processing the stream of coded bits to provide processed bits; and
   transmitting the processed bits to the STA over a combination of multiple resource units (RUs) assigned to the STA,
   wherein the processing of the stream of coded bits comprises parsing the stream of coded bits to the combination of multiple RUs in a proportional round-robin fashion, and
   wherein the parsing of the stream of coded bits to the combination of multiple RUs in the proportional round-robin fashion comprises:
   approximating a proportional ratio of a plurality of integers with each of the integers representative of a respective size of a corresponding RU of the combination of multiple RUs; and
   allocating, in an alternating fashion, a respective number of the coded bits to each RU of the combination of multiple RUs in a round-robin fashion, with the respective number being proportional to the respective size of the corresponding RU in the proportional ratio.

2. The method of claim 1, wherein the respective number of the coded bits allocated to each RU in the round-robin fashion is either 1 or a value equal to one half of a number of coded bits per single carrier for each spatial stream, whichever is larger.

3. The method of claim 1, wherein the parsing of the stream of coded bits to the combination of multiple RUs in the proportional round-robin fashion further comprises:
   in an event that there are leftover bits after the allocating in the round-robin fashion, allocating the leftover bits to one or more RUs of the combination of multiple RUs the respective size of which being larger than that of at least one other RU of the combination of multiple RUs.

4. The method of claim 3, wherein the allocating of the leftover bits to the one or more RUs of the combination of multiple RUs comprises sequentially allocating a respective portion of the leftover bits to each of the one or more RUs of the combination of multiple RUs.

5. The method of claim 3, wherein the allocating of the leftover bits to the one or more RUs of the combination of multiple RUs comprises further allocating, in the alternating fashion, a respective portion of the leftover bits to each of the one or more RUs of the combination of multiple RUs.

6. The method of claim 5, wherein the one or more RUs comprise at least two RUs of the combination of multiple RUs, and wherein the further allocating of the respective portion of the leftover bits to each of the one or more RUs of the combination of multiple RUs comprises further allocating, in the alternating fashion, an equal portion of the leftover bits to each of the one or more RUs of the combination of multiple RUs.

7. The method of claim 1, wherein the combination of multiple RUs comprises one RU of 484 tones and one RU of 996 tones, and wherein the proportional ratio is 1:2 in unit of s-bits and expressed as 1s:2s.

8. The method of claim 1, wherein the combination of multiple RUs comprises one RU of 484 tones and two RUs of 996 tones, and wherein the proportional ratio is 1:2:2 in unit of s-bits or expressed as 1s:2s:2s.

9. The method of claim 1, wherein the combination of multiple RUs comprises one RU of 484 tones and three RUs of 996 tones, and wherein the proportional ratio is 1:2:2:2 in unit of s-bits or expressed as 1s:2s:2s:2s.

10. The method of claim 1, wherein the combination of multiple RUs comprises two RUs of 996 tones, and wherein the proportional ratio is 1:1 in unit of s-bits or expressed as 1s:1s.

11. The method of claim 1, wherein the combination of multiple RUs comprises three RUs of 996 tones, and wherein the proportional ratio is 1:1:1 in unit of s-bits or expressed as 1s:1s:1s.

12. The method of claim 1, wherein the combination of multiple RUs comprises four RUs of 996 tones, and wherein the proportional ratio is 1:1:1:1 in unit of s-bits or expressed as 1s:1s:1s:1s.

13. The method of claim 1, wherein the combination of multiple RUs comprises one aggregated RU and one RU of 996 tones with the aggregated RU comprising one RU of 242 tones and one RU of 484 tones, and wherein the proportional ratio is 3:4 in unit of s-bits or expressed as 3s:4s.

14. The method of claim 1, wherein the combination of multiple RUs comprises:
one RU of 484 tones and an aggregated RU comprising one RU of 242 tones and one RU of 484 tones, with a proportional ratio of 2:3 in unit of s-bits or expressed as 2s:3s; or
a first aggregated RU and a second aggregated RU, with the first aggregated RU comprising one RU of 242 tones and one RU of 484 tones, with the second aggregated RU comprising one RU of 242 tones and one RU of 484 tones, and, with a proportional ratio of 1:1 in unit of s-bits or expressed as 1s:1s.

15. The method of claim 1, wherein the processing of the stream of coded bits further comprises:
dropping a predetermined number of tones of a plurality of tones of the combination of multiple RUs; and
processing remaining tones of the plurality of tones of the combination of multiple RUs through a joint-tone mapper,
wherein the predetermined number of tones dropped corresponds to a predetermine distance of separation between tones of the plurality of tones.

16. A method, comprising:
approximating a proportional ratio of a plurality of integers with each of the integers representative of a respective size of a corresponding resource unit (RU) of a combination of multiple RUs;
allocating, in an alternating fashion, a respective number of coded bits of a stream of coded bits to each RU of the combination of multiple RUs in a round-robin fashion, with the respective number being proportional to the respective size of the corresponding RU in the proportional ratio to provide processed bits; and
transmitting the processed bits over the combination of multiple RUs to a station (STA),
wherein the respective number of the coded bits allocated to each RU in the round-robin fashion is either 1 or a value equal to one half of a number of coded bits per single carrier for each spatial stream, whichever is larger, and
wherein parsing of the stream of coded bits to the combination of multiple RUs in the proportional round-robin fashion further comprises, in an event that there are leftover bits after the allocating in the round-robin fashion, allocating the leftover bits to one or more RUs of the combination of multiple RUs the respective size of which being larger than that of at least one other RU of the combination of multiple RUs.

17. The method of claim 16, wherein the allocating of the leftover bits to the one or more RUs of the combination of multiple RUs comprises either:
sequentially allocating a respective portion of the leftover bits to each of the one or more RUs of the combination of multiple RUs; or
further allocating, in the alternating fashion, a respective portion of the leftover bits to each of the one or more RUs of the combination of multiple RUs,
wherein, in an event that the one or more RUs comprise at least two RUs of the combination of multiple RUs, the further allocating of the respective portion of the leftover bits to each of the one or more RUs of the combination of multiple RUs comprises further allocating, in the alternating fashion, an equal portion of the leftover bits to each of the one or more RUs of the combination of multiple RUs.

18. The method of claim 16, further comprising:
dropping a predetermined number of tones of a plurality of tones of the combination of multiple RUs; and
processing remaining tones of the plurality of tones of the combination of multiple RUs through a joint-tone mapper,
wherein the predetermined number of tones dropped corresponds to a predetermine distance of separation between tones of the plurality of tones.

19. An apparatus, comprising:
a transceiver configured to communicate wirelessly; and
a processor coupled to the transceiver and configured to, via the transceiver, perform operations comprising:
coding data for a station (STA) to provide a stream of coded bits;
processing the stream of coded bits to provide processed bits; and
transmitting the processed bits to the STA over a combination of multiple resource units (RUs) assigned to the STA, wherein the processing of the stream of coded bits comprises parsing the stream of coded bits to the combination of multiple RUs in a proportional round-robin fashion, and wherein the parsing of the stream of coded bits to the combination of multiple RUs in the proportional round-robin fashion comprises:
- approximating a proportional ratio of a plurality of integers with each of the integers representative of a respective size of a corresponding RU of the combination of multiple RUs; and
- allocating, in an alternating fashion, a respective number of the coded bits to each RU of the combination of multiple RUs in a round-robin fashion, with the respective number being proportional to the respective size of the corresponding RU in the proportional ratio.

* * * * *